US011314546B2

(12) United States Patent
Saxena et al.

(10) Patent No.: US 11,314,546 B2
(45) Date of Patent: Apr. 26, 2022

(54) METHOD AND SYSTEM FOR EXECUTING A CONTAINERIZED STATEFUL APPLICATION ON A STATELESS COMPUTING PLATFORM USING MACHINE LEARNING

(71) Applicant: DATA ACCELERATOR LIMITED, London (GB)

(72) Inventors: Priya Saxena, Essex (GB); Matthew Philip Clothier, Chedzoy (GB)

(73) Assignee: DATA ACCELERATOR LTD, London (GB)

( * ) Notice: Subject to any disclaimer, the term of this patent is extended or adjusted under 35 U.S.C. 154(b) by 422 days.

(21) Appl. No.: 15/355,857

(22) Filed: Nov. 18, 2016

(65) Prior Publication Data
US 2018/0144263 A1 May 24, 2018

(51) Int. Cl.
*G06F 9/48* (2006.01)
*G06F 9/455* (2018.01)
*G06F 9/54* (2006.01)
*G06N 20/00* (2019.01)

(52) U.S. Cl.
CPC .............. *G06F 9/48* (2013.01); *G06F 9/455* (2013.01); *G06F 9/542* (2013.01); *G06N 20/00* (2019.01)

(58) Field of Classification Search
CPC .......... G06F 9/48; G06F 9/455; G06F 9/4856; G06F 16/1734; G06N 20/00
See application file for complete search history.

(56) References Cited

U.S. PATENT DOCUMENTS 7,386,662 B1 * 6/2008 Kekre ................... G06F 3/0605
711/113
8,024,732 B2 * 9/2011 Sheehan ................. G06F 9/455
718/1

(Continued)

OTHER PUBLICATIONS

Dailey et al, "Black-Box Approach to Capacity Identification for Multi-Tier Applications Hosted on Virtualized Platforms", 2011, 2011 International Conference on Cloud and Service Computing, pp. 111-117. (Year: 2011).*

(Continued)

*Primary Examiner* — Alexey Shmatov
*Assistant Examiner* — Clint Mullinax

(57) ABSTRACT

A technique for executing a containerized stateful application that is deployed on a stateless computing platform is disclosed. The technique involves deploying a containerized stateful application on a stateless computing platform and executing the stateful application on the stateless computing platform. The technique also involves during execution of the stateful application, evaluating, in an application virtualization layer, events that are generated during execution of the stateful application to identify events that may trigger a change in state of the stateful application and during execution of the stateful application, updating a set of storage objects in response to the evaluations, and during execution of the stateful application, comparing events that are generated by the stateful application to the set of storage objects and redirecting a storage object that corresponds to an event to a persistent data store if the storage object matches a storage object in the set of storage objects.

8 Claims, 22 Drawing Sheets

(56) References Cited

U.S. PATENT DOCUMENTS

| | | | | |
|---|---|---|---|---|
| 8,966,578 | B1* | 2/2015 | Belov | G06F 9/45558 726/1 |
| 9,344,497 | B2* | 5/2016 | Arthursson | G06F 9/45504 |
| 2007/0043531 | A1* | 2/2007 | Kosche | G06F 11/3471 702/182 |
| 2008/0022359 | A1* | 1/2008 | Gladstone | G06N 5/02 726/1 |
| 2009/0070878 | A1* | 3/2009 | Wang | G06F 21/52 726/24 |
| 2011/0010700 | A1* | 1/2011 | Lanner | G06F 9/44505 717/170 |
| 2011/0055278 | A1* | 3/2011 | Itoh | G06F 16/21 707/785 |
| 2012/0088584 | A1* | 4/2012 | Mamtani | H04N 19/436 463/42 |
| 2012/0110570 | A1* | 5/2012 | Jacobson | G06F 9/45533 718/1 |
| 2012/0131566 | A1* | 5/2012 | Morgan | G06F 8/65 717/170 |
| 2014/0137184 | A1* | 5/2014 | Russello | H04L 63/20 726/1 |
| 2014/0317293 | A1 | 10/2014 | Shatzkamer | |
| 2016/0092176 | A1* | 3/2016 | Straub | G06F 8/34 717/107 |
| 2016/0134616 | A1 | 5/2016 | Koushik et al. | |
| 2016/0380916 | A1* | 12/2016 | Gnaneswaran | H04L 47/803 709/224 |
| 2017/0060605 | A1 | 3/2017 | Huang et al. | |
| 2017/0147316 | A1 | 5/2017 | Reierson et al. | |
| 2017/0243001 | A1 | 8/2017 | Jawa et al. | |
| 2017/0315827 | A1* | 11/2017 | Patil | G06F 9/542 |

OTHER PUBLICATIONS

Vigay-R; "Application Packaging: Basics and Benefits"; Symantec Connect; pp. 1-6; Nov. 9, 2007.
Bugwadia, Jim; "Containerized Stateful Applications"; Nirmata; pp. 1-4; Sep. 5, 2016.
Fulton, Scott M. III; "Mesosphere's 'Container 2.0' Unites Stateless and Stateful Workloads"; The New Stack; pp. 1-10; Aug. 3, 2016.
Russinovich, Mark; "Microservices: An application revolution powered by the cloud"; 10 pgs; Mar. 17, 2016.
Fulay, Adeesh; "Containers are lightweight, fast, agile. So why aren't we using containers for stateful apps?"; pp. 1-5; Sep. 6, 2016.
Roberts, Mike; "Serverless Architectures"; pp. 1-26; Aug. 4, 2016.
Castellanos; Sara; "Look Ma, No Server: Corporate IT Expects 'Serverless' Computing to Trigger Big Changes"; The Wall Street Journal; pp. 1-2; Oct. 26, 2016.
Kouletsis, Jukka; "The Basics of Application Packaging: Best Practices for Enabling Reduced Software Management Costs"; pp. 98-101; Nov. 2005.

* cited by examiner

```
C:\temp\Briforum Demos\sage.ini
C:\temp\Briforum Demos\SGPID.dta
C:\temp\Briforum Demos\Sage.Branding.ini
C:\temp\Briforum Demos\Demodata\seed.dat
C:\temp\Briforum Demos\Demodata\ACCDATA\QUEUE.DTA
C:\temp\Briforum Demos\Demodata\ACCDATA\LiveLink_Messages_MANAGER.xml
C:\temp\Briforum Demos\Demodata\LiveLink_Configuration.xml
C:\temp\Briforum Demos\Demodata\ACCDATA\LiveLink_Configuration_MANAGER.xml
```

FIG. 4

```
C:\temp\Briforum Demos\sage.ini
C:\temp\Briforum Demos\SGPID.dta
C:\temp\Briforum Demos\Sage.Branding.ini
C:\temp\Briforum Demos\Demodataseed.dat
C:\temp\Briforum Demos\Demodata\ACCDATA\QUEUE.DTA
C:\temp\Briforum Demos\Demodata\ACCDATA\LiveLink_Messages_MANAGER.xml
C:\temp\Briforum Demos\LiveLink_Configuration.xml
C:\temp\Briforum Demos\Demodata\ACCDATA\LiveLink_Configuration_MANAGER.xml
```

FIG. 6A

```
C:\temp\Briforum Demos\sage.ini
C:\temp\Briforum Demos\SGPID.dta
C:\temp\Briforum Demos\Sage.Branding.ini
C:\temp\Briforum Demos\Demodata\seed.dat
C:\temp\Briforum Demos\Demodata\ACCDATA\QUEUE.DTA
C:\temp\Briforum Demos\Demodata\ACCDATA\LiveLink_Messages_MANAGER.xml
C:\temp\Briforum Demos\LiveLink_Configuration.xml
C:\temp\Briforum Demos\Demodata\ACCDATA\LiveLink_Configuration_MANAGER.xml C:\temp\Briforum Demos\sage.ini
C:\temp\Briforum Demos\Demodata\ACCDATA\SETUP.DTA
C:\temp\Briforum Demos\SGPID.dta
C:\temp\Briforum Demos\Sage.Branding.ini
C:\temp\Briforum Demos\Demodata\ACCDATA\QUEUE.DTA
C:\temp\Briforum Demos\Demodata\ACCDATA\ACCESS.DTA
```

FIG. 6B

```
C:\temp\Briforum Demos\Sage.ini
C:\temp\Briforum Demos\SGPID.dta
C:\temp\Briforum Demos\Sage.Branding.ini
C:\temp\Briforum Demos\Demodata\seed.dat
C:\temp\Briforum Demos\Demodata\ACCDATA\QUEUE.DTA
C:\temp\Briforum Demos\Demodata\ACCDATA\LiveLink_Messages_MANAGER.xml
C:\temp\Briforum Demos\LiveLink_Configuration.xml
C:\temp\Briforum Demos\Demodata\ACCDATA\LiveLink_Configuration_MANAGER.xml C:\temp\Briforum Demos\Sage.ini
C:\temp\Briforum Demos\Demodata\ACCDATA\SETUP.DTA
C:\temp\Briforum Demos\SGPID.dta
C:\temp\Briforum Demos\Sage.Branding.ini
C:\temp\Briforum Demos\Demodata\ACCDATA\QUEUE.DTA
C:\temp\Briforum Demos\Demodata\ACCDATA\ACCESS.DTA C:\temp\Briforum Demos\Demodata\LiveLink_Messages_MANAGER.xml
C:\temp\Briforum Demos\Demodata\LiveLink_Configuration_MANAGER.xml
```

FIG. 6C

```
C:\temp\Briforum Demos\sage.ini
C:\temp\Briforum Demos\SGPID.dta
C:\temp\Briforum Demos\Sage.Branding.ini
C:\temp\Briforum Demos\Demodata\seed.dat
C:\temp\Briforum Demos\Demodata\ACCDATA\QUEUE.DTA
C:\temp\Briforum Demos\Demodata\ACCDATA\LiveLink_Messages_MANAGER.xml
C:\temp\Briforum Demos\Demodata\ACCDATA\LiveLink_Configuration.xml
C:\temp\Briforum Demos\Demodata\ACCDATA\LiveLink_Configuration_MANAGER.xml C:\temp\Briforum Demos\sage.ini
C:\temp\Briforum Demos\Demodata\SETUP.DTA
C:\temp\Briforum Demos\SGPID.dta
C:\temp\Briforum Demos\Demodata\ACCDATA\QUEUE.DTA
C:\temp\Briforum Demos\Sage.Branding.ini
C:\temp\Briforum Demos\Demodata\ACCDATA\ACCESS.DTA
C:\temp\Briforum Demos\Demodata\ACCDATA\LiveLink_Messages_MANAGER.xml
C:\temp\Briforum Demos\Demodata\ACCDATA\LiveLink_Configuration_MANAGER.xml HKCU\Software\Classes\RepDesFile
HKCU\Software\Classes\Local Settings\Software\Microsoft\Windows\Shell
HKCU\Software\Microsoft\Windows\CurrentVersion\Internet Settings
HKCU\Software\Microsoft\Windows\CurrentVersion\Explorer
```

FIG. 6D

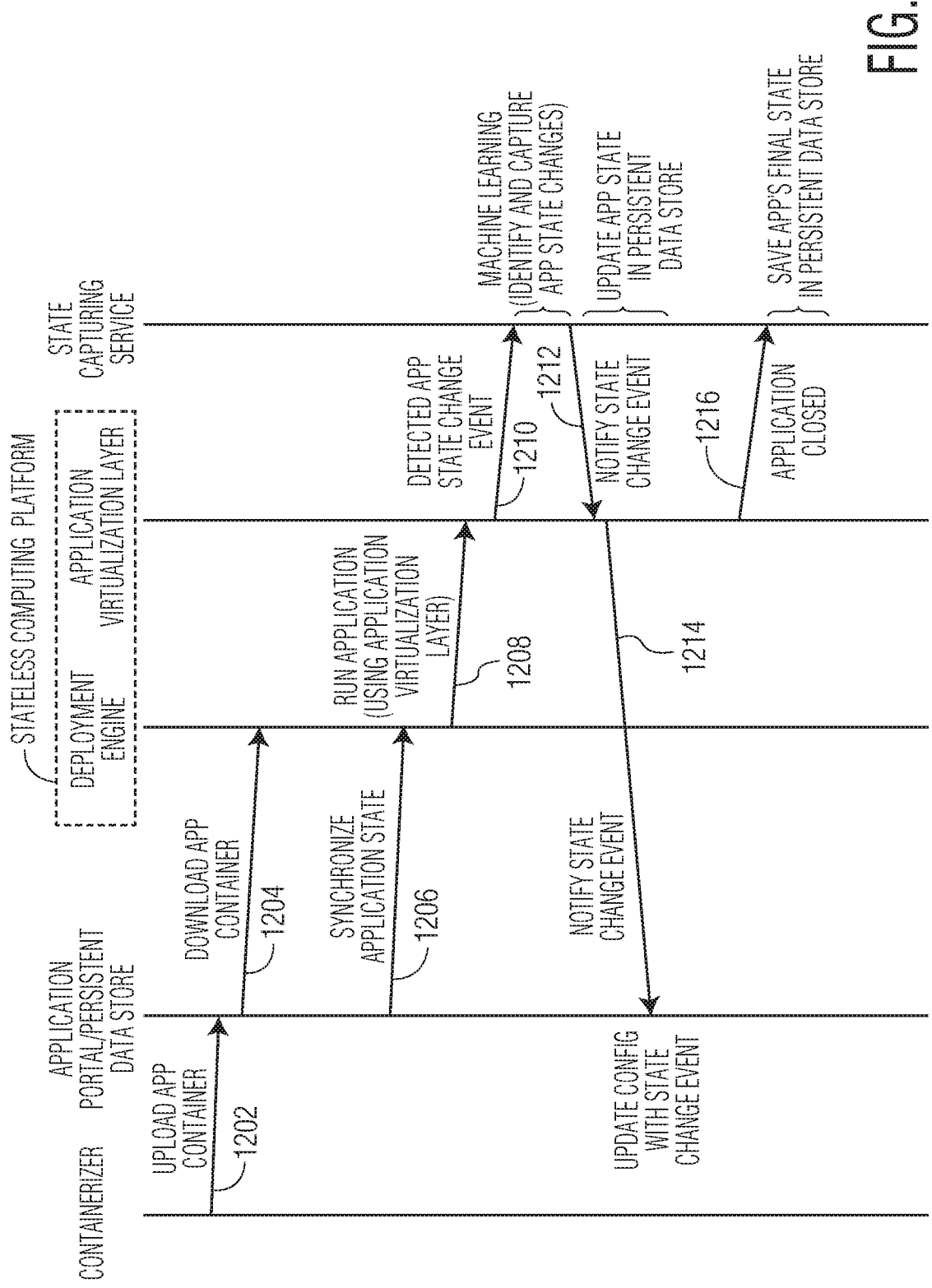

| HANDLE | TYPE | OPERATION | LOCATION | DATA |
|---|---|---|---|---|
| IDENTIFIER | FILE/REG | API CALL | {PATH} | {VALUE} |

{ } OPTIONAL

FIG. 13

| 0x0100 | FILE (0) | CreateFile | C:\TEMP\A.txt |
|---|---|---|---|
| IDENTIFIER | TYPE | API CALL | PATH |

FIG. 14

| 0x0100 | FILE (0) | WriteFile | DATA |
|---|---|---|---|
| IDENTIFIER | TYPE | API CALL | DATA |

FIG. 15

| 0x0100 | FILE (0) | CloseFile |
|---|---|---|
| IDENTIFIER | TYPE | API CALL |

FIG. 16

| 0x0100 | REG (1) | RegCreateKey | HKCU\XX\YY |
|---|---|---|---|
| IDENTIFIER | TYPE | API CALL | PATH |

FIG. 17

| 0x0100 | REG (1) | RegOpenKey | HKCU\XX\YY |
|---|---|---|---|
| IDENTIFIER | TYPE | API CALL | PATH |

FIG. 18

| 0x0100 | REG (1) | RegSetValue | VALUE |
|---|---|---|---|
| IDENTIFIER | TYPE | API CALL | VALUE |

FIG. 19

| 0x0100 | REG (1) | RegCloseKey |
|---|---|---|
| IDENTIFIER | TYPE | API CALL |

FIG. 20

METHOD AND SYSTEM FOR EXECUTING A CONTAINERIZED STATEFUL APPLICATION ON A STATELESS COMPUTING PLATFORM USING MACHINE LEARNING

FIELD OF THE INVENTION

The invention relates generally to executing a containerized stateful application on a stateless computing platform. For example, the invention relates to capturing state information related to the containerized stateful application in a persistent data store while the application executes on the stateless computing platform.

BACKGROUND

Techniques for capturing the state of an application executing on a stateless computing platform are known. One conventional technique for capturing the state of an application executing on a stateless computing platform involves monitoring a static set of storage objects to capture state changes, where storage objects include, for example, state related files, directories, and registries. For example, a static set of file paths and registries is predefined during a containerization phase and the static set of file paths and registries is monitored in an application virtualization layer while the application is executed on a stateless computing platform during a deployment phase. Although using a static set of storage objects works well to capture state information, the technique will only capture state information for the storage objects in the static set of storage objects.

BRIEF DESCRIPTION OF THE DRAWINGS

FIG. 4 depicts an example of a static set of storage objects that can be monitored by an application virtualization layer to redirect state information to a persistent data store.

FIGS. 6A-6D depict a time sequence of a set of storage objects as the set of storage objects is updated on-the-fly as the containerized application executes on the stateless computing platform.

FIG. 12 is a timing diagram of the workflow described above with reference to FIGS. 1, 2, and 9-11D.

FIG. 13 is an example of a generic frame format used for recording state change operations.

FIG. 14 is an example of a create file/open file frame format.

FIG. 15 is an example of a write file frame format.

FIG. 16 is an example of a close file frame format.

FIG. 17 is an example of a create registry frame format.

FIG. 18 is an example of an open registry frame format.

FIG. 19 is an example of a modify registry frame format.

FIG. 20 is an example of a close registry frame format.

Throughout the description, similar reference numbers may be used to identify similar elements. Additionally, in some cases, reference numbers are not repeated in each figure in order to preserve the clarity and avoid cluttering of the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The below described technique relates to a containerized stateful application that is deployed to an application portal for execution on a stateless computing platform in a manner that maintains the state of the containerized stateful application even though the application is executed on a stateless computing platform.

Figure 1:
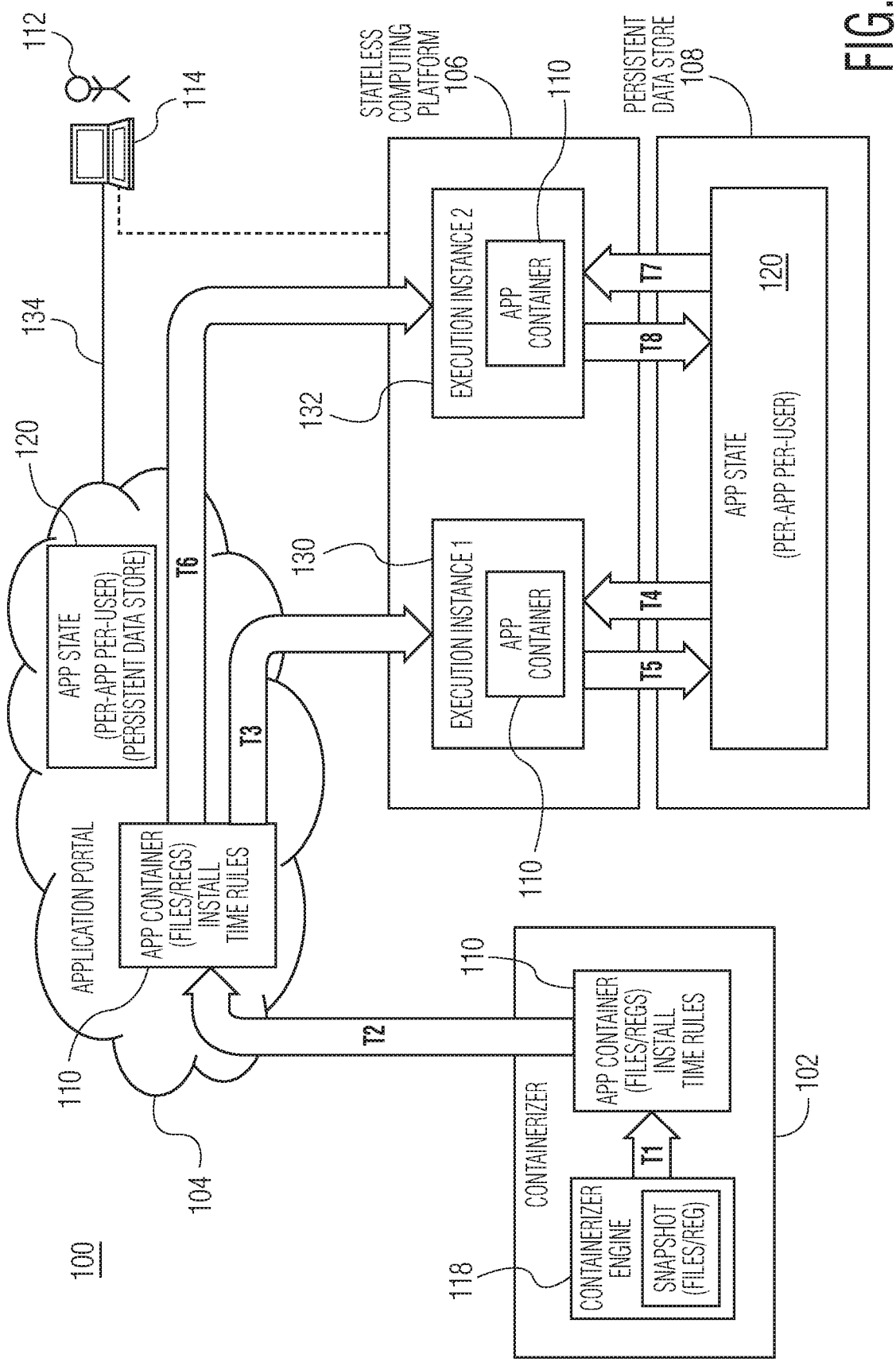
FIG. 1 illustrates an example high-level workflow related to a containerized stateful application that is executed on a stateless platform in a manner that maintains the state of the containerized stateful application.

FIG. 1 illustrates an example high-level workflow in a system 100 related to a containerized stateful application that is executed on a stateless platform in a manner that maintains the state of the containerized stateful application. The workflow includes operations related to a containerizer 102, operations related to an application portal 104, operations related to a stateless computing platform 106, and operations related to a persistent data store 108.

The containerizer 102 includes a computing system that is used to containerize an application. Applications may include office productivity applications such as word processors, spreadsheets, and presentation applications, application plug-ins, communications applications such as web browsers and email clients, and a multitude of enterprise applications, e.g., accounting, personnel management, sales, product management, project management, etc. In an embodiment, applications include applications configured to run on the WINDOWS operating system. In an embodiment, applications may work in tandem with each other. In another embodiment, an application may be formed by a combination of applications that work in tandem with each other. For example, a web browser plug-in may work in tandem with a web browser and the combination of the web browser plug-in and the web browser is referred to as an application.

In an embodiment, application containerization is an operating system level virtualization method for deploying and running applications without launching an entire virtual machine (VM) for each instance of the application. Instead, multiple isolated systems are run on a single control host and access a single kernel. Thus, a containerized application is an application that includes all of the components such as files, environment variables, and libraries necessary to run a desired application. In an embodiment, an application container (referred to herein as an "app container") wraps an application in a complete file system that contains all the components needed to run successfully, including, for example, executable code, runtime components, system tools, and system libraries. Using such an app container, an application is able to run on many different platforms, including, for example, physical computers, virtual machines, bare-metal servers, and cloud server clusters.

Containerizing an application is the process of binding the relevant files and components to build an app container. In an embodiment, containerizing an application involves a containerizer engine 118 that captures an application's install time (e.g., all files and registries that an application modifies while installing) and runtime dependencies to generate a self-contained app container. The containerizer engine may also analyze the application's runtime environment to detect unidentified files/registries and/or read/write operations that are performed by the application at runtime. The resulting app container includes the files and registries along with install time rules. For example, install time rules include file and registry redirection rules. In an embodiment, the install time rules of a particular app package are the same for every instance of the application that is downloaded from the application portal by a user for execution on the stateless computing platform. Thus, the install time rules are agnostic to a particular user.

In general, application virtualization is a technique in which an application is decoupled from the underlying operating system of the physical machine (or machines) on which the application executes. Various techniques for application virtualization are known in the field. In general, a "virtualized application" or "application virtualization" involves techniques that decouple applications from the underlying operating system of the computing platform. In an embodiment, decoupling applications from the underlying operating system of the computing platform involves separating, dividing, insulating, and/or protecting the operating system from the virtualized application. For example, an application is virtualized so that when the application is installed on a computing platform, the application does not write or dilute the operating system files or registries and/or does not corrupt the operating system itself. In an embodiment, an application virtualization layer creates a "sandbox," which is an insulated environment on the computing platform. For example, a "sandbox" may include controls that limit access by the application to files, registries, certain hardware, and/or certain other applications. Application virtualization can utilize user-space/user-mode (referred to herein as "user-space") virtualization techniques and/or kernel-space/kernel-mode (referred to herein as "kernel-space") virtualization techniques. In an embodiment, user-space virtualization can be implemented without needing administrative rights to access certain resources, such as certain files/registries. In an embodiment, a virtualized application is not installed on the computing platform in a conventional manner in that in a convention installation the application declares, while installing on the operating system, that the application is installing and hence the operating system is aware that something was installed. Additionally, in a conventional installation, the application writes specific files/registries in the installation areas of the registry (e.g., protected areas of the memory that require admin rights to access) to make the operating system aware of the application. On the other hand, in an embodiment, a virtualized application does not declare to the operating system that the application is installing. Therefore, the operating system does not necessarily know that an application was installed at least because the application writes all the files and registries used by the application to run in a virtualized file system and a virtualized registry area. In an embodiment, a virtualized file system and virtualized registry are files and registries that are created in a separate location (e.g., a separate namespace) other than the operating system's default location. Locating such files and registries in a separate location (e.g., in a separate namespace) is a technique used to sandbox, or "containerize," the files and/or registries used by the application. Using the virtualized file system and virtualized registry, the operations triggered by the application will be performed on the virtual files and/or registries to prevent the application from reading/writing to the system folders and registries of the operating system. For example, an application might require its files to be in "c:\ProgramFiles\ApplicationVendor\ApplicationName." In an embodiment, these files are virtualized so that when the application looks for files in "c:\ProgramFiles\ApplicationVendor\ApplicationName" the file system API calls are redirected to "c:\Sandbox\ProgramFiles\ApplicationVendor\ApplicationName."

An application that is installed in a conventional matter is often referred to as a "native" application whereas an application installed using a virtualized file system and a virtualized registry area is referred to as a "virtualized application." In an embodiment, execution of a virtualized application at run-time is controlled by an application virtualization layer. In an embodiment, a virtualized application appears to a user to interface directly with the computing platform's operating system, but the virtualized application interfaces with the application virtualization layer. In an embodiment, the application virtualization layer intercepts communications (e.g., events such as API calls) between the application and the operating system and acts as a proxy between the application and the native system registries and system files of the operating system running on the computing platform. In an embodiment, the application virtualization layer "hooks" into events (e.g., API calls) at the dynamic-link library (DLL) (e.g., NTDLL) level. Implementing application virtualization using hooking in the application virtualization layer is known in the field. In an embodiment, the application virtualization layer can implement virtual registry files and secure file stores within the sandbox.

Referring again to FIG. 1, the application portal 104 is a computing resource that stores an app container 110 for access by an end-user 112 via an end-user device 114. In an embodiment, the application portal may store more than one containerized application. For example, in an embodiment, an enterprise may maintain an application portal that includes multiple different containerized applications that can be accessed by end-users on an as-needed basis. In an embodiment, access to the applications is subject to proper access rights. In an embodiment, the containerized application portal includes a web based architecture, which could be hosted in a public and/or private cloud or on-premise. The application portal is capable of saving the app containers, saving application-specific and user-specific state information (app state 120) in a persistent data store, handling user/group based roles for each app container, performing on-the-fly customizations, and delivering the app containers on-demand from, for example, a public/private cloud or on-premise servers.

The stateless computing platform 106 includes computing resources that can be used to execute the containerized applications that are stored on the application portal. In an embodiment, the stateless computing platform may include computing resources such as a stateless pool of servers, stateless Remote Desktop Service (RDS) pools, a server-less computing architecture, an Infrastructure as a service (IaaS) environment, desktop systems, physical or virtual disks, system volumes, application layering disks, etc. In an embodiment, the computing platform is "stateless" in that state information generated during execution of the containerized application is not saved in the memory of the stateless computing platform once the application is closed, e.g., the state information does not "persist" in the stateless computing platform after execution of the application is ended.

In an embodiment, the persistent data store 108 includes memory to store state information related to execution of an application so that the state information survives after the process with which the data was created has ended, e.g., after the application is closed or ended. The persistent data store may include non-volatile memory such as semiconductor or solid state memory (e.g., flash memory), magnetic tape, a rigid magnetic disk, and an optical disk. In an embodiment, the persistent data store may be implemented as a volume storage, network share storage, and/or cloud storage. The persistent data store may be integrated within the application portal 120 and/or separate from the application portal.

The workflow illustrated in FIG. 1 is now described with reference to a sequence of task arrows that are identified as task arrows T1-T8. Task arrow T1 illustrates the generation of an app container 110 by the containerization engine 118 of the containerizer 102. In an embodiment, the containerization engine generates the app container by capturing an application's install time (e.g., using snapshots to capture all files and registries that an application modifies while installing) and runtime dependencies to generate a self-contained app container. In an embodiment, the app container includes a complete file system that contains all the components needed for the application to run successfully, including, for example, executable code, runtime components, system tools, an application virtualization layer, and system libraries.

Task arrow T2 illustrates the uploading of the app container 110 to the application portal 104, where the app container is stored for use by an end-user 112. Once the app container is uploaded to the application portal, the containerized application is considered to be "deployed" for general use. In one embodiment, general use may be limited to users within an enterprise, in another embodiment, general use may be limited to users with certain access rights (e.g., registered users, subscribers, etc.), and in another embodiment, general use may include any user that has access to the public Internet. Identifying the breath of access to a containerized application that is deployed on the application portal is implementation specific. Tasks T1 and T2 are typically performed by a system administrator, such as an Information Technology (IT) specialist.

Task arrow T3 illustrates deployment of the containerized application onto the stateless platform for execution in response to activation by the end-user 112 that accesses the application portal via the end-user device 114. Execution of the containerized application involves downloading of the app container 110 to the stateless computing platform 106, unpacking of the app container, and execution of the application on the stateless computing platform. Operations related to this deployment are identified as "execution instance 1," 130. Execution instance 1 may utilize any of the computing resources available in the stateless computing platform. For example, execution instance 1 may use a first set of computing resources (e.g., virtual machines, servers, CPUs, RAM, etc.) to execute the containerized application. In an embodiment, the end-user device may be a computing device that enables access to the application portal via a network connection 134, which could be a wired connection, a wireless connection, or a combination thereof. Example end-user devices include desktop computers, laptop computers, thin client computers, pad computers, and mobile devices such as smartphones and smart watches. Other types of end-user devices are also possible.

Upon executing the containerized application on the stateless computing platform 106, a first operation may involve checking to see if there is any state information that has been previously stored for the particular containerized application and the particular end-user of the containerized application. In an embodiment, checking for state information is controlled by a deployment engine (not shown) that executes upon selecting the containerized application. Task arrow T4 illustrates previously captured state information (e.g., app state 120) being obtained by the containerized application from the persistent data store for execution instance 1.

Once the previously captured state information (e.g., app state 120) is obtained by the containerized application from the persistent data store 108, the application is executed in execution instance 1 130 as controlled by the end-user 112. For example, the end-user may interact with/control a productivity application or a database application from the end-user device 114. During execution of the containerized application, state information may be generated by the containerized application. For example, state information may include storage objects such as configuration files, configuration databases, directories that include configuration information, registries, and information generated during execution of the application. For example, during execution of an application new records (e.g., new account records such as new customer records, new report templates, new invoices, etc.) may be generated and/or modified that are also included in the state information. When using a stateful application, it is desirable to store such state information so that the end-user will have continuity between uses of the application. For example, if an end-user sets a user preference (e.g., a preferred font) in the application, it is desirable to have the user preference stay set the next time the application is accessed from the application portal 104 by the user. Task arrow T5 illustrates state information of the application being stored in the persistent data store. Techniques for capturing and storing state information in the persistent data store are described in detail below. In an embodiment, closing the application will trigger saving of state information to the persistent data store. In an embodiment, state information is stored to the persistent data store on a periodic basis during use of the application (e.g., every 5 minutes) and upon closing the application although other approaches are possible. For example, the state information may be stored only upon closing the application.

After an end-user has closed an application, the end-user may at some point in time use the containerized application again. For example, the end-user 112 may navigate to the application portal 104 and select the desired containerized application or the user may activate a shortcut icon available on the user's device. In any case, task arrow T6 illustrates a second deployment of the containerized application onto the stateless computing platform 106 for execution. Again, execution of the containerized application involves downloading of the app container 110, unpacking of the app container, and execution of the application on the stateless computing platform. Operations related to the second deployment are referred to as "execution instance 2," 132. Execution instance 2 may utilize any of the computing resources (e.g., virtual machines, servers, CPUs, RAM, etc.) in the stateless computing platform. For instance, execution instance 2 may use a second set of computing resources to execute the application and the set of computing resources used in execution instance 2 may be different from the set of computing resources used in execution instance 1. Although not depicted in FIG. 1, it is also possible that execution instance 2 could execute on a different stateless computing platform. That is, the app container 110 could be downloaded to computing resources of a stateless computing platform that is separate from the stateless computing platform 106, such that execution instances of the containerized application can roam from instance to instance between stateless computing platforms depending on conditions such as, for example, resource load, resource capability, and resource cost.

Upon executing the containerized application at the stateless computing platform 106, a first operation may involve checking to see if there is any state information that has been previously stored for the particular containerized application and the particular user of the application. Task arrow T7 illustrates previously stored state information (e.g., app state 120) being obtained by the containerized application from the persistent data store 108 for execution instance 2, 132.

Once the stored state information is obtained by the containerized application from the persistent data store 108, the application is executed in execution instance 2 as controlled by the end-user 112. For example, the end-user interacts with/controls the same productivity application or database application as was used in execution instance 1. During execution of the application, additional state information may be generated by the containerized application. When using a stateful application, it is desirable to store such state information so that the end-user will have continuity between uses of the application. For example, if an end-user sets another user preference (e.g., a preferred toolbar layout) in the application, it is desirable to have the user preference stay set the next time the application is accessed by the user from the application portal. Task arrow T8 illustrates state information of the application being stored in the persistent data store. Again, the techniques for capturing and storing state information in the persistent data store are described in detail below. In an embodiment, closing the application triggers saving of the state information to the persistent data store. In an embodiment, state information is stored to the persistent data store on a periodic basis during use of the application (e.g., every 5 minutes) and upon closing the application.

Figure 2:
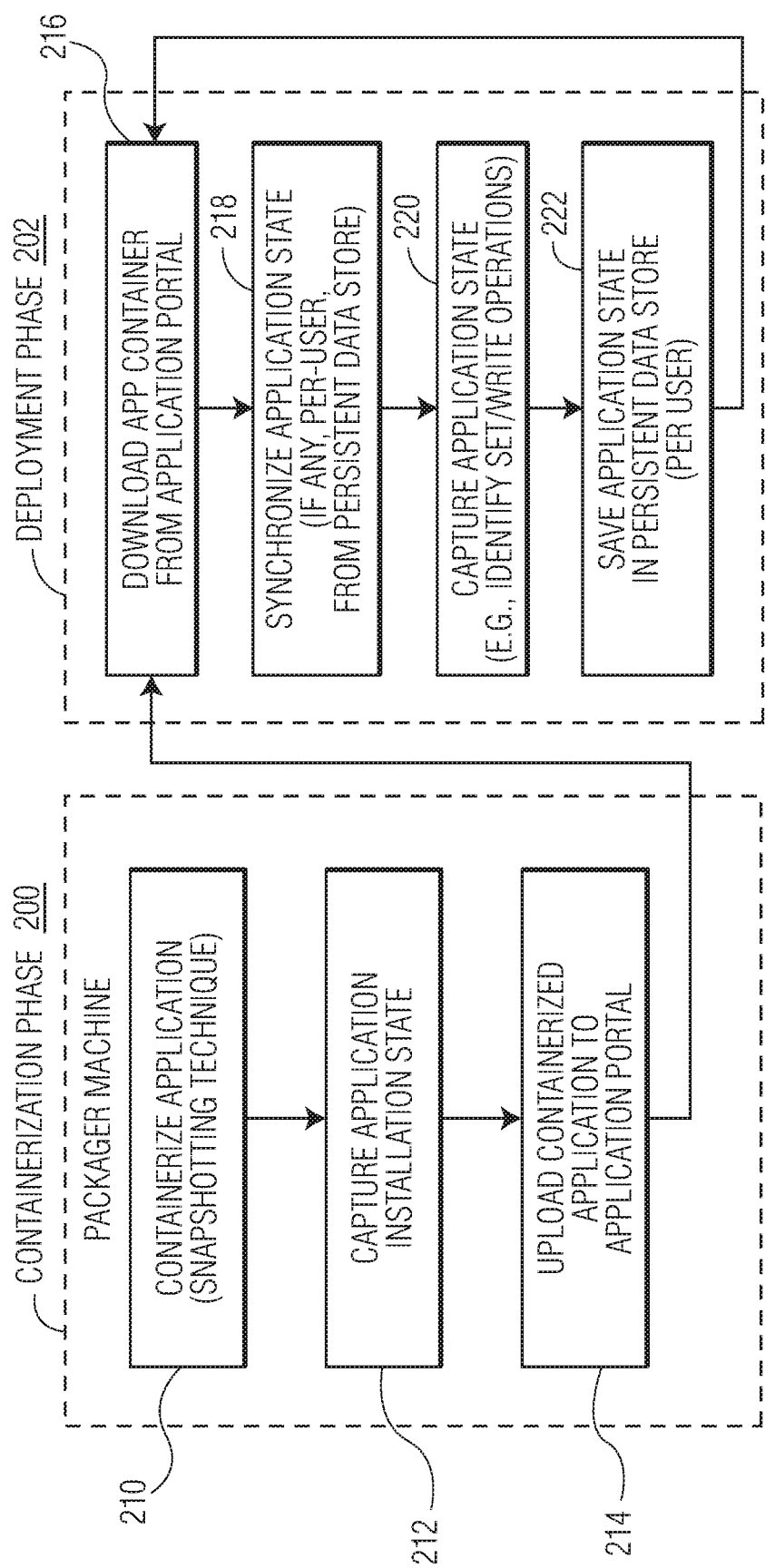
FIG. 2 is a process flow diagram of a state capturing workflow for a containerized stateful application that corresponds to the workflow illustrated in FIG. 1 and includes a containerization phase and a deployment phase.

As can be seen from the workflow illustrated in FIG. 1, application state can be maintained on a per-application and per-user basis across multiple uses of the particular containerized application by a particular end-user even though the containerized application is executed on a stateless computing platform. FIG. 2 is a process flow diagram of a state capturing workflow for a containerized stateful application that corresponds to the workflow illustrated in FIG. 1. The process flow illustrated in FIG. 2 can be generally categorized into two phases, a containerization phase 200 and a deployment phase 202. Operations of the containerization phase include containerizing the application (block 210), capturing the application installation state (block 212), and uploading the containerized application (e.g., as an app container) to the application portal (block 214). In an embodiment, containerizing the application involves capturing an application's install time (e.g., using snapshots to capture all files and registries that an application modifies while installing) and runtime dependencies to generate a self-contained app container. In an embodiment, the app container includes a file system that contains all the application components needed to run the application successfully, including, for example, the application executables, runtime components, system tools, a virtualization layer, and system libraries. Tasks T1 and T2 in FIG. 1 correspond to the containerization phase. In an embodiment, capturing the application's installation state involves capturing the application's install time rules, e.g., the file and registry redirection rules. In an embodiment, capturing the installation state of an application involves determining which files and/or registries have changed after the application is installed. In an embodiment, the installation state is captured by taking a pre-installation snapshot of the files and registries, installing the application, and then taking a post-installation snapshot of the files and registries to determine what has changed. The difference between the files and registries between pre and post installation constitutes the "installation state." In an embodiment, containerizing an application involves creating a configuration file with the redirection rules for the files and/or registries of the installation state and copying the configuration file into the app container, which can be uploaded to the application portal.

In an embodiment, uploading the containerized application involves uploading the app container to the application portal for general use by the appropriate end-users. In an embodiment, operations of the containerization phase 200 are performed by a system administrator, such as an IT specialist. Once the app container is uploaded to the application portal, the containerized application is considered to be "deployed" for general use by end-users. As described above, access to containerized applications on the application portal is implementation specific.

Operations of the deployment phase 202 include downloading the app container from the application portal to the stateless computing platform (block 216), synchronizing application state (block 218), capturing application state (block 220), and saving application state (block 222). The deployment phase may be implemented at least in part by the application portal 104 and the stateless computing platform 106 as described above with reference to FIG. 1. In an embodiment, an end-user navigates to the application portal and triggers (e.g., by double clicking on an application icon) execution of the containerized application on the stateless computing platform. For example, double clicking on an application icon selects the containerized application and causes the app container to be downloaded to the stateless computing platform for execution. In an embodiment, a next operation involves synchronizing the application's state with state information (e.g., application-specific and user-specific state information) that was previously stored in the persistent data store. For example, synchronizing application state may involve accessing a state tracking service at the application portal to find state information related to the particular application and end-user combination. In an embodiment, double clicking on the app container launches a deployment engine that manages downloading of the application container and synchronizing the application's state.

In an embodiment, a next operation involves capturing the state of the application as the application executes on the stateless computing platform (block 220). A technique for capturing the state of the application as the application executes on the stateless computing platform is described in detail below with reference to FIGS. 5-21.

In an embodiment, a next operation is to save the application's state in the persistent data store (block 222). For example, the application's state is saved on an application-specific and a user-specific basis so that the same end-user of a containerized application will experience consistent state between subsequent uses of the same containerized application. In an embodiment, state information is stored to the persistent data store on a periodic basis during use of the application (e.g., every 5 minutes) and upon closing the application.

Figure 3:
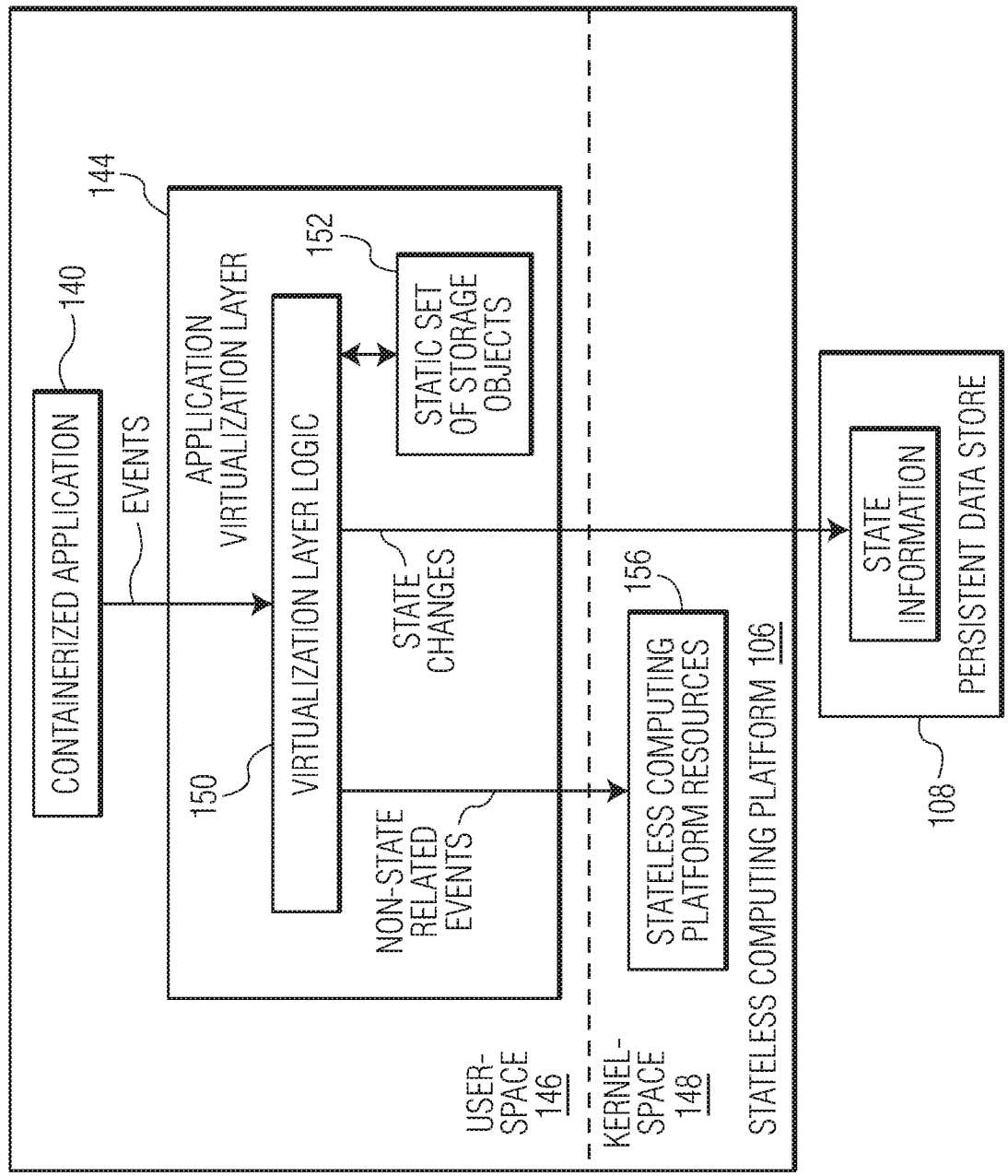
FIG. 3 illustrates an example of a conventional technique for capturing the state of a containerized application executing on a stateless computing platform during the deployment phase.

Techniques for capturing the state of an application executing on a stateless computing platform are known. One conventional technique for capturing the state of an application executing on a stateless computing platform involves monitoring a static set of storage objects to capture state changes, where storage objects include, for example, state related files, directories, and registries. For example, a static set of file paths and registries is predefined during the containerization phase and the static set of file paths and registries is monitored in an application virtualization layer while the application is executed on a stateless computing platform during the deployment phase. FIG. 3 illustrates an example of a conventional technique for capturing the state of a containerized application executing on a stateless computing platform during the deployment phase. As illustrated in FIG. 3, a containerized application 140 and an application virtualization layer 144 execute in the user-space 146 of the stateless computing platform 106 and stateless computing platform resources 156 execute in the kernel-space 148. During execution of the containerized application, events are generated, for example, the events include API calls as is known in the field and the events are monitored by the application virtualization layer. In an embodiment, virtualization layer logic 150 of the application virtualization layer monitors events that are generated by the containerized application to determine if an event matches a storage object in the static set of storage objects 152. For example, the virtualization layer logic compares file paths or registries of API calls to the static set of file paths and registries to see if there is a match. In an embodiment, the set of storage objects that is monitored is static in that the set of storage objects does not change during the deployment phase. FIG. 4 depicts an example of a static set of storage objects that can be monitored by an application virtualization layer to redirect state information to a persistent data store. During operation, when an event matches a storage object in the static set of storage objects, then state changes related to the storage object are redirected to the persistent data store 108. FIG. 3 illustrates state changes that have been redirected to the persistent data store by the application virtualization layer. If an event does not have a file path or registry that matches a file path or registry in the static set of storage objects, then the event is determined to be non-state related and the event passes to the stateless computing platform resources for processing. FIG. 3 also illustrates non-state related events being passed from the application virtualization layer to stateless computing platform resources 156 of the stateless computing platform for processing.

Although the technique illustrated in FIG. 3 works well to capture state information corresponding to the static set of storage objects 152 that is monitored by the application virtualization layer 144, the technique will only capture state information for the storage objects in the static set of storage objects. Therefore, if the static set of storage objects does not include every possible storage object that may include state information, some state information may not be captured in the persistent data store. Many applications utilize a wide variety of storage objects depending on the manner in which the applications are used. Trying to identify every possible state-related storage object during the containerization phase for every containerized application that may be offered on an application portal can be a difficult and resource intensive operation. For example, identifying state related storage objects during the containerization phase 200 (FIG. 2) is typically a manual process that requires constant human interaction to influence workflow and manually identify the corresponding state related storage objects. Even during the manual process, it is quite difficult to ensure that all state related storage objects are identified.

In accordance with an embodiment of the invention, a technique for executing a containerized stateful application that is deployed on a stateless computing platform is disclosed. The technique involves deploying a containerized stateful application on a stateless computing platform and executing the stateful application on the stateless computing platform. The technique also involves during execution of the stateful application, evaluating, in an application virtualization layer, events that are generated during execution of the stateful application to identify events that may trigger a change in state of the stateful application and during execution of the stateful application, updating a set of storage objects in response to the evaluations, and during execution of the stateful application, comparing events that are generated by the stateful application to the set of storage objects and redirecting a storage object that corresponds to an event to a persistent data store if the storage object matches a storage object in the set of storage objects. As indicated above, the technique involves evaluating events that may trigger a change in state of the stateful application and updating a set of storage objects in response to the evaluation. Because the set of storage objects is updated during execution of the application, the technique does not rely on a static set of storage objects to capture all state information. It has been realized that there are certain events generated by a containerized stateful application that tend to trigger changes in state. For example, it has been learned that certain file related API calls with a desired access of "write" and certain registries with a desired access of "write," "set," or "set value" tend to correspond to changes in state of the executing stateful application. Thus, by configuring an application virtualization layer to identify such events as a containerized application is executing on a stateless computing platform, a set of storage objects can be generated and updated during the deployment phase as the containerized application generates events that are specific to a particular end-user's interaction with and/or control of the containerized application. That is, a set of storage objects is automatically learned (e.g., by "machine learning") during execution of the application in the deployment phase without the need for human interaction and without having to manually run through each possible workflow in the containerization phase. Applying machine learning to the process of capturing state information for a containerized application during the deployment phase enables a set of storage objects to be custom generated "on-the-fly" on a per-application and per-user basis in a manner that can be efficiently implemented. In addition, because state information is captured and stored in a persistent data store on-the-fly on a per-application and per-user basis, a containerized application can easily roam between stateless computing platforms, resulting in a "nomadic" containerized application or simply a nomadic container.

For example, in WINDOWS applications, it has been found that certain file related events with the desired access of "write" tend to relate to state information. In particular, events identified at least in part as "CreateFile" and "WriteFile" with a desired access of "write" tend to relate to state information. Additionally, it has been found that certain registry related events with desired access of "write," "set," or "set value," tend to relate to state information. In particular, events identified at least in part as "RegCreateKey," "RegOpenKey," "RegSetKeyValue," and "RegSetValue" tend to relate to state information. With such events identified, the application virtualization layer of a containerized application can be configured to recognize these events while the application is being used by an end-user and to trigger an automatic update of the set of storage objects during execution of the application on the stateless computing platform.

The technique for capturing state information can be implemented in different ways. For example, in one embodiment, the capturing of state information is implemented primarily within the application virtualization layer (referred to below as the "dynamic redirection" approach). In another embodiment, a portion of the state capturing workload is offloaded to a state capturing service (referred to below as the "state capture service" approach), which can reduce the processing burden on the application virtualization layer.

Figure 5:
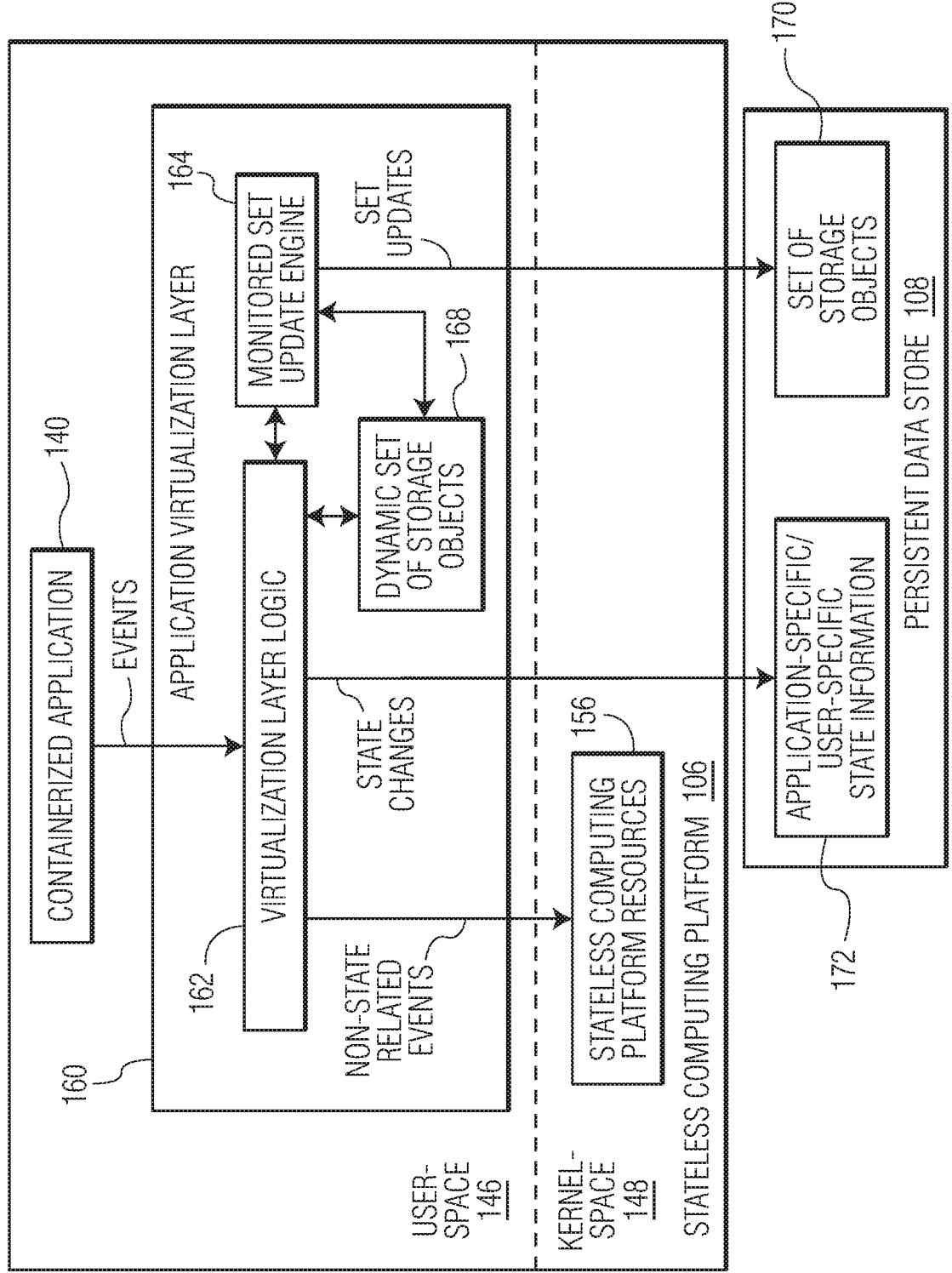
FIG. 5 illustrates an example of a technique for executing a containerized stateful application that is deployed on a stateless computing platform in which the capturing of state information is primarily implemented within the application virtualization layer.

FIG. 5 illustrates an example of a technique for executing a containerized stateful application that is deployed on a stateless computing platform in which the capturing of state information is primarily implemented within the application virtualization layer. As illustrated in FIG. 5, a containerized application 140 (e.g., deployed from an application portal) and an application virtualization layer 160, which may be included in the application container or downloaded from the application portal by a deployment engine, execute in the user-space 146 of a stateless computing platform 106. During execution of the containerized application, events are generated, for example, the events include API calls as is known in the field. The events are monitored by the application virtualization layer. In an embodiment, virtualization layer logic 162 of the application virtualization layer evaluates the events that are generated by the containerized application to determine if an event matches an identified set of events with a particular desired access. For example, the virtualization layer logic monitors the events for events that include a particular call type with a desired access of "write," "set," or "set value." In an embodiment, the virtualization layer logic monitors for events such as CreateFile, WriteFile, DeleteFile, CloseFile, RegCreateKey, RegOpenKey, RegSetKeyValue, RegSetValue, RegSaveKey, RegDeleteKey, and RegDeleteValue events or events with similar functionality in order to capture state information. If such events are identified, the events are evaluated to see if a set of storage objects should be updated. For example, if a CreateFile event includes a desired access of "write," then a storage object (e.g., C:\pathA\pathB\fileC.txt) that corresponds to the event should be added to the set of storage objects if the storage object does not already exist in the set of storage objects. In an embodiment, storage objects may include configuration files (e.g., files that include path redirection rules), directories that include configuration information, configuration databases, data files, and other files and/or registries that relate to the state of an application.

With reference to FIG. 5, in an embodiment, the virtualization layer logic 162 filters the events to identify events with a desired access of "write," "set," or "set value." In an embodiment, "set" and "set value" are considered synonymous. When identified, such events are handled by a monitored set update engine 164 of the application virtualization layer 160. In an embodiment, the monitored set update engine is implemented in computer executable code that is integrated into the application virtualization layer and the monitored set update engine evaluates an event to determine if a storage object corresponding to the event matches a storage object that is already in a set of storage objects 168 that is held in the in-process memory of the application virtualization layer. In an embodiment, in-process memory refers to memory of the stateless computing platform that is cleared (i.e., does not persist) after an execution instance ends. For example, volatile memory used to execute an application in a particular execution instance is "in-process memory" that is cleared in the stateless computing platform once execution of the application is ended. If the storage object corresponding to the event does not match a storage object that is already in the set of storage objects, then the storage object is added to the set of storage objects. FIGS. 6A-6D depict a time sequence of a set of storage objects as the set of storage objects is updated on-the-fly as the containerized application executes on the stateless computing platform. FIG. 6A depicts the set of storage objects at time, $t_1$. At some point later in time, the set of storage objects is updated in response to an event that was generated by the containerized application executing on the stateless computing platform. FIG. 6B depicts the set of storage objects at time, $t_2$. At some point later in time, the set of storage objects is updated in response to an event that was generated by the containerized application executing on the stateless computing platform. FIG. 6C depicts the set of storage objects at time, $t_3$. At some point later in time, the set of storage objects is updated in response to an event that was generated by the containerized application executing on the stateless computing platform. FIG. 6D depicts the set of storage objects at time, $t_4$. In an embodiment, the set of storage objects (identified as a "dynamic" set of storage objects in FIG. 5) is maintained in in-process memory of the application virtualization layer as, for example, a search tree that is used by the virtualization layer logic to monitor storage objects. Because the containerized application is executed on the stateless computing platform, the set of storage objects that is maintained in the in-process memory of the application virtualization layer will not be maintained in the in-process memory of the application virtualization layer once the application is ended.

In addition to updating the set of storage objects 168 in the in-process memory of the application virtualization layer 160, the monitored set update engine 164 may periodically store the set of storage objects 170, or updates thereof, in the persistent data store 108. Storing the set of storage objects in the persistent data store enables the set of storage objects to be recalled upon a subsequent use of the application by the same end-user. Thus, the set of storage objects is maintained between uses (i.e., persists) and can be recalled into in-process memory of the stateless computing platform upon a subsequent use of the containerized application 140, which can reduce the processing load on the application virtualization layer to avoid delays that may be attributed to state capturing operations.

In addition to updating the set of storage objects 168 that is monitored by the application virtualization layer 160, the application virtualization layer also redirects state related storage objects to the persistent data store 170. For example, storage objects corresponding to events that tend to trigger changes in state are redirected to the persistent data store by the application virtualization layer using application virtualization techniques. FIG. 5 illustrates stat changes being sent from the application virtualization layer to the persistent data store to update application-specific and user-specific state information 172. State information can be stored in the persistent data store on an application-specific and user-specific basis so that a user can have a consistent user experience between uses of the containerized application.

Figure 7A:
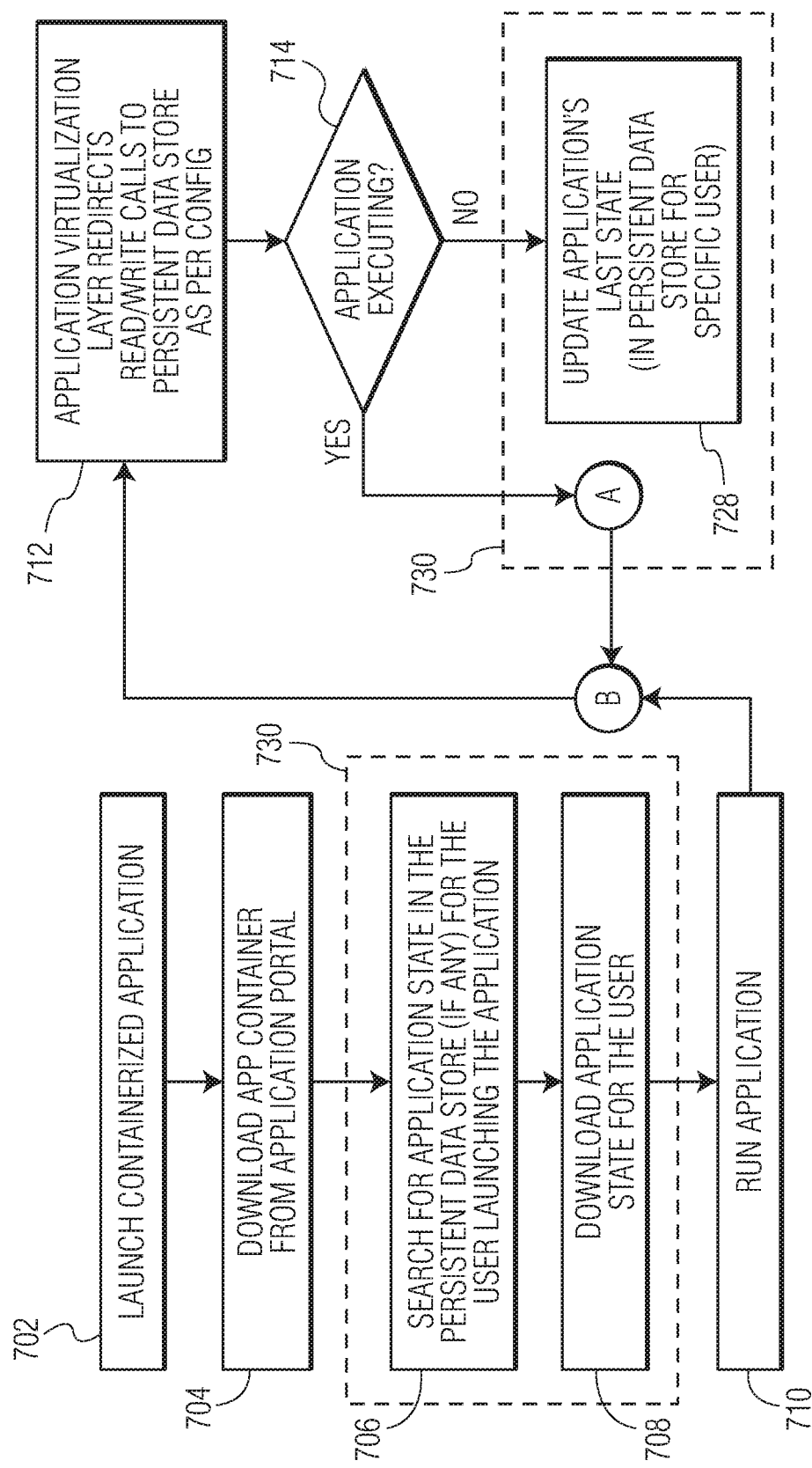
FIGS. 7A and 7B are process flow diagrams of an example embodiment of operations that occur during the deployment phase of a containerized stateful application.
Figure 7B:
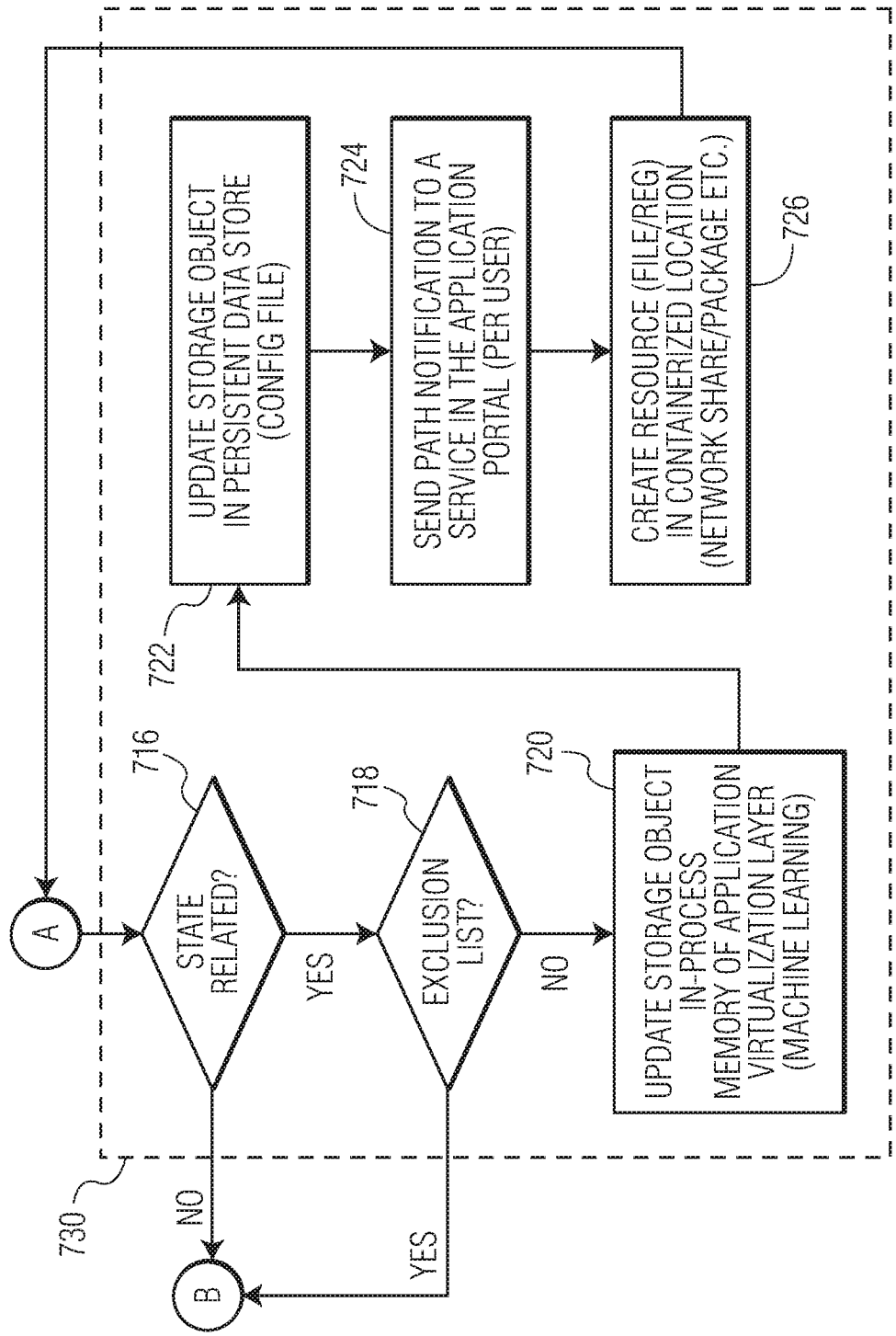

The operations described with reference to FIGS. 5-6D occur during the deployment phase 202 (FIG. 2) of a containerized stateful application. FIGS. 7A and 7B are process flow diagrams of an example embodiment of operations that occur during the deployment phase of a containerized stateful application. At block 702, the containerized application is launched. For example, launching the containerized application involves an end-user navigating to an application icon at an application portal and then selecting (e.g., double clicking on) the application icon. At block 704, launching the application causes the corresponding app container to be downloaded to the stateless computing platform, unpackaged, and executed. At block 706, there is a search for state information (application state) that is stored in the persistent data store for the user launching the containerized application. In an embodiment, a deployment engine, which may be triggered upon selection of the app container, may search a persistent data store for application-specific and user-specific state information that matches the current application and the end-user. In an embodiment, a deployment engine is implemented as user-space computer code that runs on the stateless computing platform and supports downloading the app container from the application portal, synchronizing the application's state from the persistent data store, preparing the environment for the application to run, and maintaining offline allowance, licensing, and usage reporting on a per-application and per-user basis.

At block 708, if state information has been previously stored in a persistent data store, the state information (application state) is downloaded from the persistent data store and incorporated into the application virtualization layer. For example, application-specific and user-specific state information is synchronized with the application and the set of storage objects is loaded into the in-process memory of the application virtualization layer. Using such an approach, the containerized application that is stored on the application portal is agnostic to the end-user, but from the user's perspective, state is maintained between uses of the application.

At block 710, the application is run on the stateless computing platform. At block 712, the application virtualization layer redirects storage objects corresponding to certain events to the persistent data store as specified by redirection rules of the application virtualization layer (e.g., redirection rules provided in a configuration file).

At decision point 714, it is determined if the application is still executing on the stateless computing platform. If the application is still executing on the stateless computing platform, then the process proceeds (via element A) to decision point 716 (FIG. 7B). At decision point 716, it is determined if the event is related to the state of the application. If the event is not related to the state of the application, then the process proceeds (via element B) back to block 712 (FIG. 7A). If, however, the event is related to the state of the application (e.g., the event has a particular name and has a desired access of "write," "set," or "set value"), then the process proceeds to decision point 718. At decision point 718, it is determined if the corresponding storage object is included on an exclusion list. In an embodiment, an exclusion list identifies storage objects that do not relate to state information and/or to storage objects that should be excluded from the state capturing process for some other reason. If the storage object is on the exclusion list, then the process proceeds (via element B) back to block 712 (FIG. 7A). Using an exclusion list may help to prevent storage objects that do not relate to the state of an application from being added to the set of storage objects that is monitored by the application virtualization layer. In an embodiment, the exclusion list can be used to exclude information from being persisted even if the information is state related. The exclusion list can give a user the option to customize or "tune" the capture of state information. For example, an application may have forty files on which a write operation is performed but out of the forty files, a user may only want to capture state information for ten of the files. Thus, thirty of the files could be added to the exclusion list to prevent state information from being captured and saved in the persistent data store. If the storage object is not on an exclusion list, then at block 720, the storage object is added to the set of storage objects that is monitored by the application virtualization layer. For example, the storage object is added to a search tree that is held in the in-process memory of the application virtualization layer as the containerized application executes on the stateless computing platform. Thus, a set of storage objects is automatically learned (e.g., by "machine learning") during execution of the application in the deployment phase without the need for human interaction and without having to manually run through each possible workflow in the containerization phase. Next, at block 722, the storage object is updated in the persistent data store. For example, the storage object is added to a configuration file that includes the set of storage objects. In an embodiment, the persistent data store is updated upon identification of each new storage object and in other embodiments, updates are made periodically, in batches, and/or after the application is closed. Additional steps may be taken to make the state information accessible for subsequent uses. For example, at block 724, a path notification may be sent to a service hosted at the application portal to update the service on the application-specific and user-specific path. At block 726, a resource (e.g., a storage object such as a file/registry) is created in a containerized location at, for example, the application portal. The process then returns to element A.

Returning back to decision point 714 in FIG. 7A, if it is determined that the application is no longer executing (e.g., the user has signaled to close the application), at block 728, the application's latest state information is updated by sending the latest state information, or any last state updates, to the persistent data store. In the process flow diagrams of FIGS. 7A and 7B, state related workflow is indicated within the dashed line boxes 730.

Figure 8:
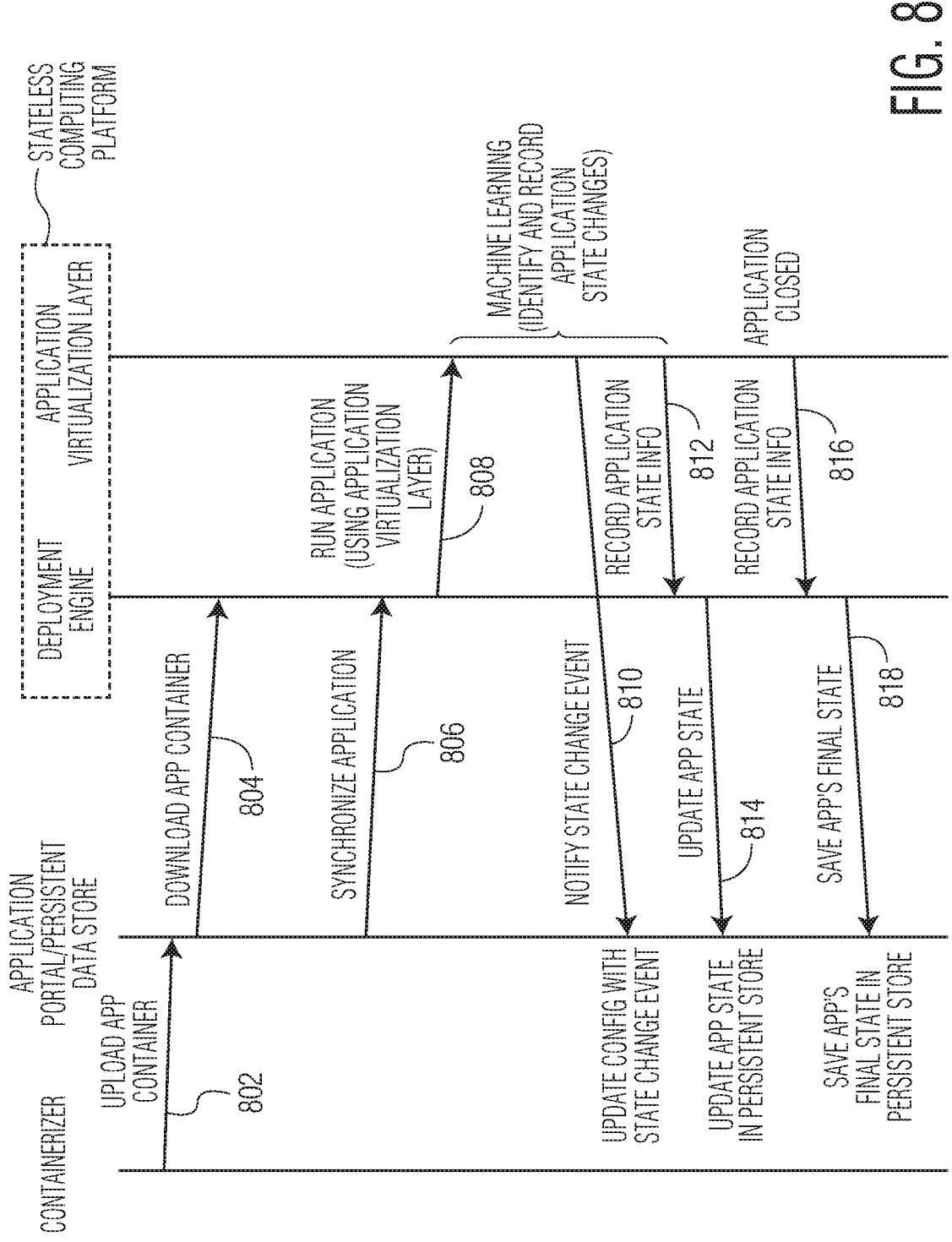
FIG. 8 is a timing diagram of the workflow described above with reference to FIGS. 1, 2, and 5-7B.

FIG. 8 is a timing diagram of the workflow described above with reference to FIGS. 1, 2, and 5-7B. At operation 802, an app container is uploaded from the containerizer to the application portal. In FIG. 8, the application portal includes a persistent data store that is used to store application state information. At operation 804, the app container is downloaded from the application portal to a deployment engine that executes on the stateless computing platform. In an embodiment, the deployment engine is included in the app container and executes upon downloading of the app container. At operation 806, the state of the application is synchronized with any state information that is stored in the persistent data store. At operation 808, the application is run (e.g., executed on the stateless computing platform) using the application virtualization layer. Once the application begins running, events are evaluated by the application virtualization layer to identify events that may trigger state changes and a set of storage objects is updated in response to the evaluations. As described above, machine learning is used to identify state related storage objects during execution of the application on the stateless computing platform and the identified state related storage objects are recorded (e.g., added to a set of storage objects). The set of storage objects is stored in the in-process memory of the application virtualization layer while the application is executing on the stateless computing platform and the set of storage objects is also stored in the persistent data store so that the state information is preserved for a next use of the containerized stateful application by the same user.

At operation 810, the application portal is notified of a state change event so that an application-specific and user-specific configuration file can be updated to ensure that the state information (e.g., redirection rules) is captured and persists after the execution instance ends. In an embodiment, the application portal updates the application-specific and user-specific configuration file in response to the state change event notification. At operation 812, application state information is recorded, e.g., passed from the in-process memory of the application virtualization layer to the deployment engine. At operation 814, the deployment engine sends an application state update to the persistent data store. At operation 816, the application is closed (e.g., execution of the application on the stateless computing platform is ended) and application state information is recorded, e.g., sent from the application virtualization layer to the deployment engine. At operation 818, the latest state information, or any last state update, is sent form the deployment engine to the persistent data store for storage.

Figure 9:
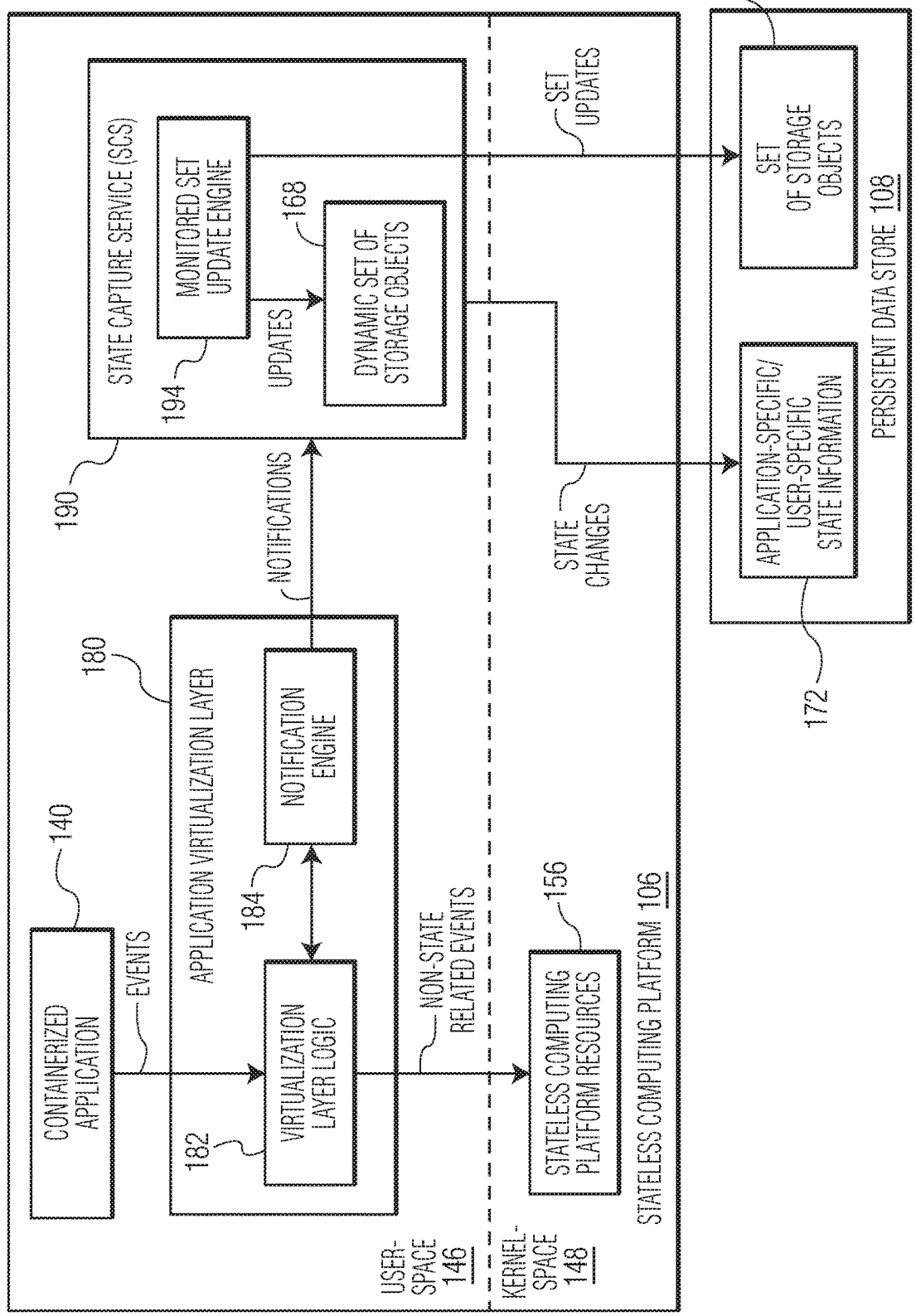
FIG. 9 illustrates an example of a technique for executing a containerized stateful application that is deployed on a stateless computing platform in which a portion of the state capturing workload is offloaded to a state capturing service.

In the embodiment described above with reference to FIGS. 5-8, the application virtualization layer implements the operations to capture state information and to update the set of storage objects. In another embodiment, a portion of the processing to capture the state information is offloaded from the application virtualization layer to a state capture service, for example, a state capture service that executes separate from the application virtualization layer. FIG. 9 illustrates an example of a technique for executing a containerized stateful application that is deployed on a stateless computing platform in which a portion of the state capturing workload is offloaded from the application virtualization layer to a state capturing service. By offloading some operations related to capturing state information from the application virtualization layer to a state capture service, the application virtualization layer is able to efficiently implement virtualization operations with less drag from state capturing operations while still maintaining the state of the stateful application as the stateful application executes on the stateless computing platform. In an embodiment, the application virtualization layer identifies the events that tend to trigger changes in state and then sends state related notifications (e.g., from a notification engine) to the state capture service, which uses the notifications to capture application-specific and user-specific state information and to update a set of storage objects. In an embodiment, the state capture service is embodied in code that is not commingled with the code of the application virtualization layer and executes on the stateless computing platform as a separate instance from the execution of the containerized application.

As illustrated in FIG. 9, a containerized application 140 (e.g., deployed from an application portal), an application virtualization layer 180, which may be included in the application container, and a state capture service (SCS) 190 execute in the user-space 146 of a stateless computing platform 106. During execution of the containerized application, events are generated, for example, the events include API calls as is known in the field. The events are monitored by the application virtualization layer. In an embodiment, virtualization layer logic 182 of the application virtualization layer evaluates events that are generated by the containerized application to determine if an event matches an identified set of events with a particular desired access. For example, the virtualization layer logic monitors the events for events that include a desired access of "write," "set," or "set value." In an embodiment, the virtualization layer logic monitors for events such as CreateFile, WriteFile, DeleteFile, CloseFile, RegCreateKey, RegOpenKey, RegSetKeyValue, RegSetValue, RegSaveKey, RegDeleteKey, and RegDeleteValue events.

If such events are identified, the events are provided to a notification engine 184 that executes as part of the application virtualization layer 180. The notification engine sends notifications to the state capturing service 190 and the state capturing service evaluates the events to see if the set of storage objects should be updated. For example, if a CreateFile event includes a desired access of "write," then a corresponding storage object (e.g., C:\pathA\pathB\fileC.txt) of the event should be added to a set of storage objects if the storage object does not already exist in the set of storage objects.

With reference to FIG. 9, in an embodiment, notifications are handled by a monitored set update engine 194 of the state capturing service 190. The monitored set update engine evaluates the event (which is communicated via a notification) to determine if a storage object corresponding to the event matches a storage object that is already in the set of storage objects 168. If the storage object corresponding to the event does not match a storage object that is already in the set of storage objects, then the storage object is added to the set of storage objects. The set of storage objects can be updated as described above with reference to FIGS. 6A-6D. In an embodiment, the set of storage objects is maintained in in-process memory of the state capture service as, for example, a search tree that is used by the state capture service to monitor storage objects. Additionally, the monitored set update engine may periodically store the set of storage objects 170, or updates thereof, in the persistent data store 108. Storing the monitored set of storage objects in the persistent data store enables the set of storage objects to be recalled for a subsequent use of the application by the same end-user. Thus, the monitored set of storage objects is maintained between uses (e.g., persists) and can be recalled into in-process memory of the stateless computing platform upon a subsequent use of the containerized application, which can reduce the processing load on the state capturing service to avoid delays that may be attributed to state capturing operations.

In addition to updating the set of storage objects 168 that is monitored by the state capture service 190, the state capture service also redirects state related storage objects to the persistent data store. For example, storage objects corresponding to events that tend to trigger changes in state are redirected to the persistent data store by the state capture service using redirection rules obtained from a configuration file and redirection rules learned from processing the notifications received from the notification engine 184. In an embodiment, state information 172 can be stored in the persistent data store 108 on an application-specific and user-specific basis so that an end-user can have a consistent user experience between uses of the containerized application.

Figure 10:
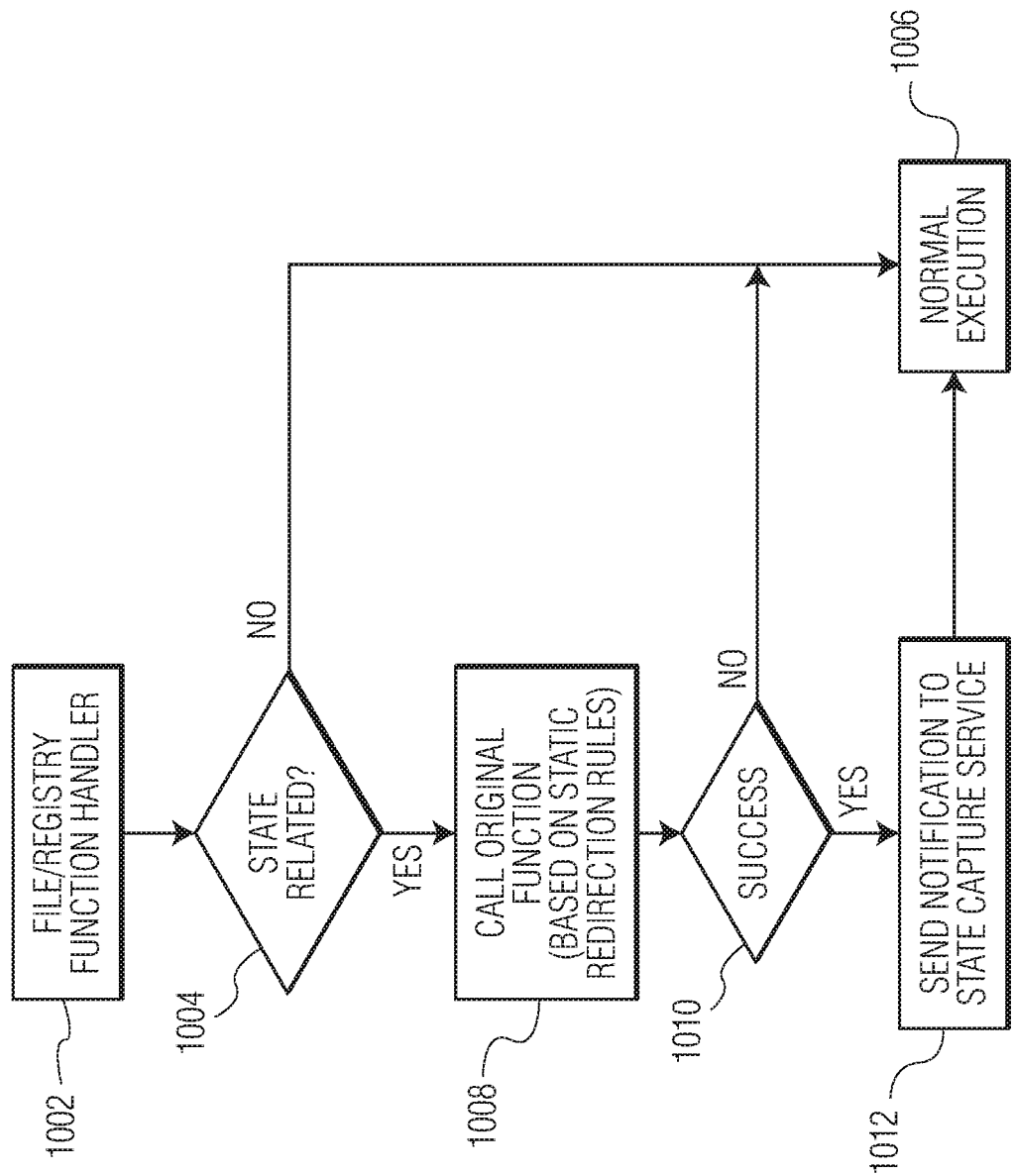
FIG. 10 illustrates operations corresponding to the technique illustrated in FIG. 9 that are performed by the application virtualization layer during the deployment phase.
Figure 11A:
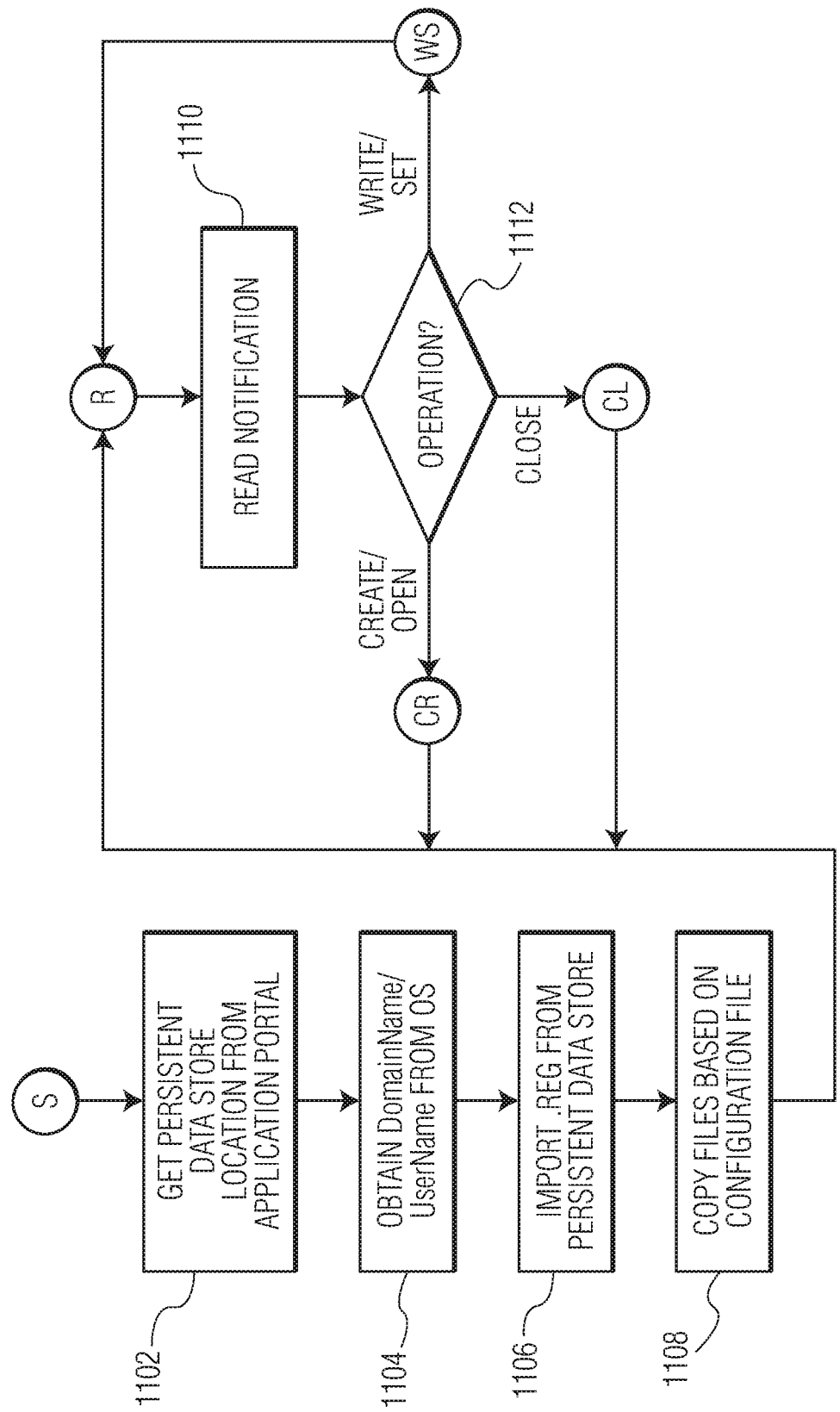
FIGS. 11A-11D illustrate operations corresponding to the technique illustrated in FIG. 9 that are performed by the state capture service.
Figure 11C:
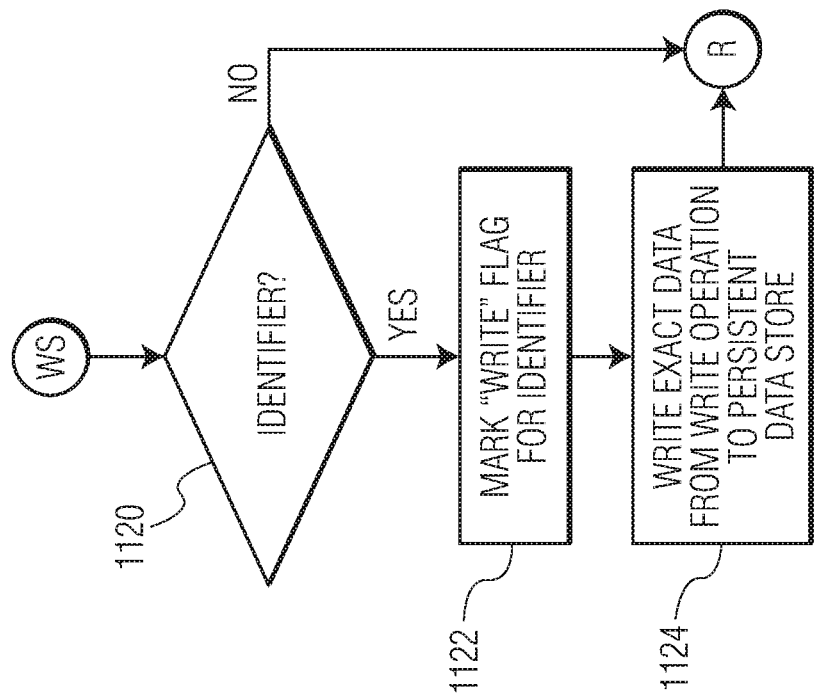

The operations described with reference to FIG. 9 occur during the deployment phase 202 (FIG. 2). FIGS. 10-11D are process flow diagrams of an example embodiment of operations that occur during the deployment phase of a containerized stateful application. For example, FIG. 10 illustrates operations that are performed by the application virtualization layer during the deployment phase. At block 1002, an event is received at, for example, a function handler, and evaluated. In an embodiment, the event includes an API call and a storage object, for example, the event may be: CreateFile(C:\pathA\pathB\fileC.txt), with desired access is "write". At decision point 1004, it is determined if the event is related to the state of the application. In an embodiment, an event is considered state related if the event has a particular name and has a desired access of "write," "set," or "set value." Events that may be related to state include CreateFile, WriteFile, DeleteFile, CloseFile, RegCreateKey, RegOpenKey, RegSetKeyValue, RegSetValue, RegSaveKey, RegDeleteKey, and RegDeleteValue. In an embodiment, events such as DeleteFile, CloseFile, RegDeleteKey, and RegDeleteValue may be related to state in that they trigger files/registries to be deleted and/or trigger certain state capture operations as described, for example, with reference to FIGS. 11A and 11D. If the event is not related to the state of the application, then the process proceeds to normal execution of the event, block 1006. If, however, the event is related to the state of the application (e.g., the event has a particular name and has a desired access of "write," "set," or "set value"), then the process proceeds to block 1008. At block 1008, the original function of the event is called (e.g., based on static redirection rules). For example, a function "CreateFile C:\fileC.txt" is redirected as "CreateFile C:\pathA\pathB\fileC.txt". At decision point 1010, it is determined if the function has been successfully completed. If the function has not been successfully completed (e.g., the operating system did not create the file), then the process proceeds to normal execution, block 1006. If, however, the function has been successfully completed, then the process proceeds to block 1012. At block 1012, a notification is sent to the state capture service. For example, the notification includes information related to the event such as an event handle, an event type indicator, an event name, a path, and corresponding data. Example frame formats for notifications are described below with reference to FIGS. 13-20. As is described in more detail below, the state capture service helps to capture state information related to the execution of a stateful application on the stateless computing platform. Once the notification is sent, the process proceeds to normal execution, block 1006.

FIGS. 11A-11D illustrate operations that are performed by the state capture service. At element S, a new instance of an application starts execution on a stateless computing platform and triggers the launch of the state capture service. At block 1102, a location of state related information in a persistent data store is obtained from the application portal. For example, a location within a persistent date store for application-specific and user-specific state information is obtained from the application portal. At block 1104, a DomainName/UserName is obtained from the operating system. In an embodiment, obtaining the DomainName/UserName enables execution of the instance of the application to be captured for a particular user. For example, the state of an application could be captured for two different users, UserA and UserB, with the paths "\\network-share\domain1\UserA\AppX" and "\\network-share\domain1\UserB\AppX", respectively. When UserA accesses application X from the application portal, application-specific and user-specific state information is obtained from (and saved to) path "\\network-share\domain1\UserA\AppX" and when UserB accesses application X from the application portal, application-specific and user-specific state information is obtained from (and saved to) path "\\network-share\domain1\UserB\AppX". At block 1106, registries (e.g., a .reg file) are imported from the persistent data store. At block 1108, files based on the configuration file are copied. In an embodiment, a previous set of storage objects is obtained from the persistent data store and loaded as a search tree into the in-process memory of the state capture service. At element "R," a notification is received from the notification engine of the application virtualization layer. At block 1110, the notification is read. At decision point 1112, the type of operation identified by the notification is determined. For example, it is determined if the notification identifies a create/open operation (identified as element "CR"), a write/set operation (identified as element "WS"), or a close operation (identified as element "CL"). If the notification identifies a create/open operation (CR), then the process proceeds to FIG. 11B, if the notification identifies a write/set operation (WS), then the process proceeds to FIG. 11C, and if the notification identifies a close operation (CL), then the process proceeds to FIG. 11D.

Figure 11B:
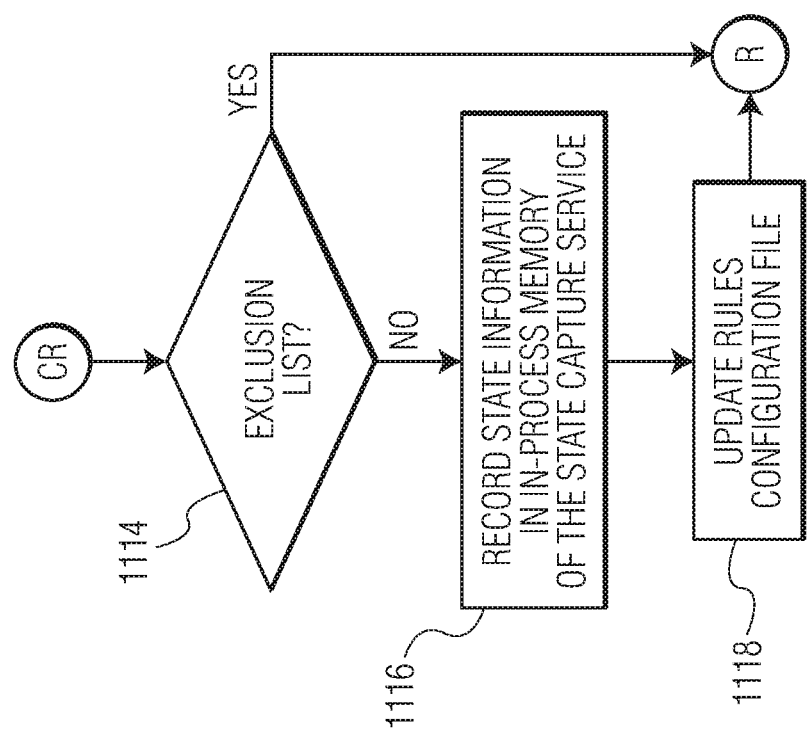
Figure 11D:
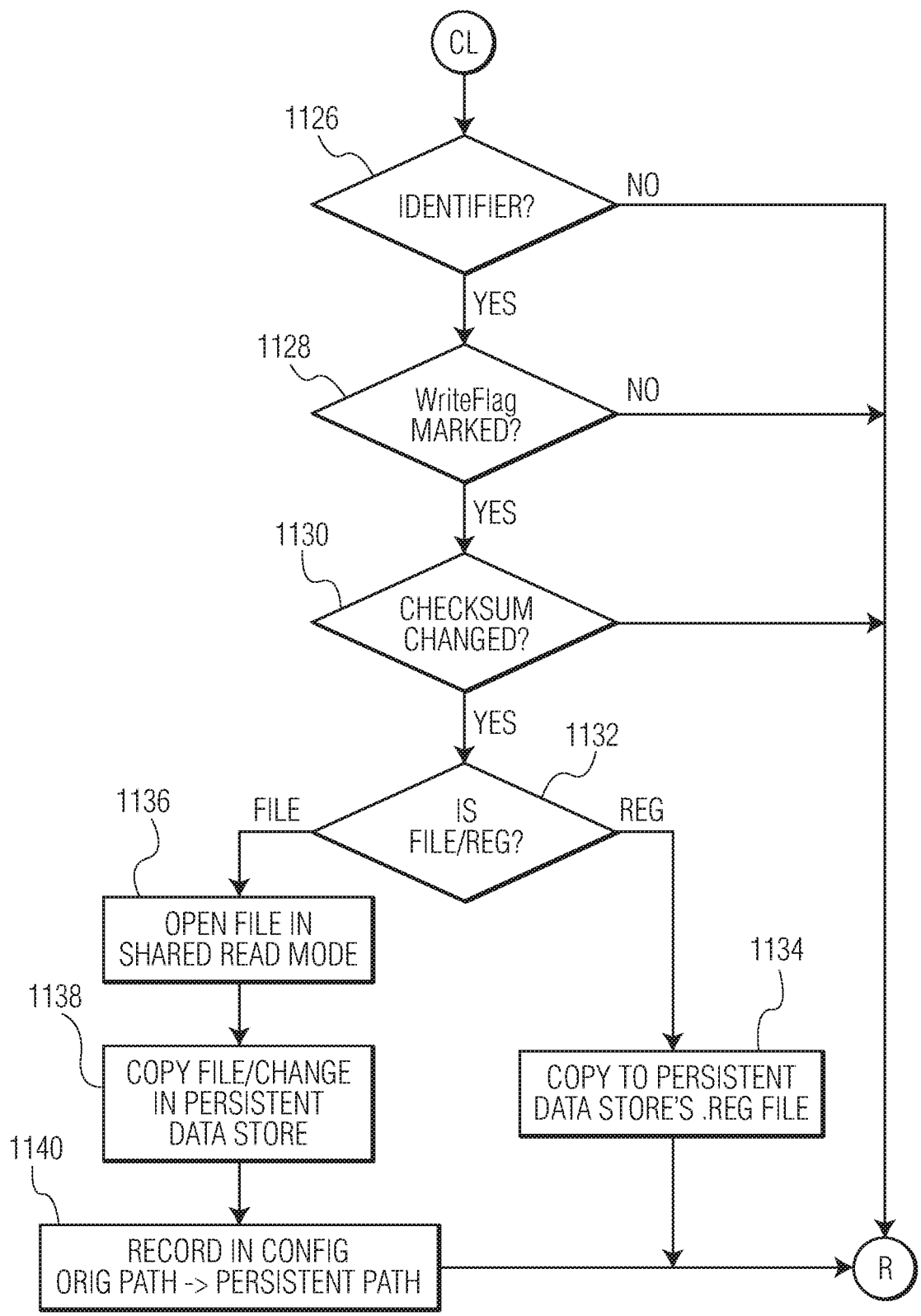

With reference to FIG. 11B, if the notification identifies a create/open operation (CR), at decision block 1114, it is determined if the storage object represented in the notification is on an exclusion list. In an embodiment, an exclusion list identifies storage objects that do not relate to state information or to storage objects that should be excluded from the state capturing process for some other reason. If the storage object is on the exclusion list, then the process proceeds back to element R (FIG. 11A) to await another notification. Using an exclusion list may help to prevent storage objects that do not relate to the state of an application from being added to the set of storage objects that is monitored by the state capture service. If the storage object represented in the notification is not on the exclusion list, then the process proceeds to block 1116. At block 1116, the storage object is recorded in the in-process memory of the state capture service. For example, the search tree that is maintained in the in-process memory of the state capture service is updated to include the storage object. Thus, a set of storage objects is automatically learned (e.g., by "machine learning") during execution of the application in the deployment phase without the need for human interaction and without having to manually run through each possible workflow in the containerization phase. At block 1118, an application-specific and user-specific redirection rules configuration file (e.g., a rules configuration file) is updated in the application portal and/or the persistent data store to include the storage object.

With reference to FIG. 11C, if the notification identifies a write/set operation (WS), at decision point 1120, it is determined if the notification has an identifier. If the notification does not have an identifier, then the process proceeds back to element R (FIG. 11A). If, however, the notification does have an identifier, then, at block 1122, a "write" flag is marked for the identifier and the process proceeds to block 1124. At block 1124, the exact data from the write operation is written and then the process proceeds back to element R (FIG. 11A). In an embodiment, only the delta (e.g., actual data changed) is saved instead of copying the entire file to the persistent data store every time there is a write operation. For example, the "WriteFile( )" call contains a buffer as its second parameter, which is the actual data that will be written to the file after executing the operation. In this example, the data that was sent in the WriteFile call is read and copied to the file that exists in the persistent data store. So, instead of copying the entire file, just the data that the call holds in its parameter is written.

With reference to FIG. 11D, if the notification identifies a close notification (CL), at decision point 1126, it is determined if the notification has an identifier. If the notification does not have an identifier, then the process proceeds back to element R (FIG. 11A). If, however, the notification does have an identifier, then, at decision point 1128, it is determined if the "WriteFlag" is marked in the notification. If the "WriteFlag" is not marked in the notification, then the process proceeds back to element R (FIG. 11A). If, however, the "WriteFlag" is marked, then, at decision point 1130, it is determined if a checksum has changed. If a checksum has not changed (e.g., indicating that the data to be written has not changed), then the process proceeds back to element R (FIG. 11A). If, however, the checksum has changed (e.g., indicating that the data to be written has changed), then, at decision point 1132, it is determined if the notification corresponds to a file or to a registry. If the notification corresponds to a registry, then, at block 1134, the storage object is copied to the corresponding .reg file in the persistent data store. If the notification corresponds to a file, then, at block 1136, the corresponding file is opened in, for example, shared read mode. Next, at block 1138, the file, or simple changes in the file, is copied to the persistent data store. Next, at block 1140, the redirected path, e.g., the original path redirected to the persistent data store, is recorded in the configuration file on an application-specific and user-specific basis.

FIG. 12 is a timing diagram of the workflow described above with reference to FIGS. 1, 2, and 9-11D. At operation 1202, an app container is uploaded from the containerizer to the application portal. In FIG. 12, the application portal includes a persistent data store that is used to store application state information. At operation 1204, the app container is downloaded from the application portal to a deployment engine of the stateless computing platform. In an embodiment, the deployment engine is included in the app container and executes on the stateless computing platform. At operation 1206, the application state is synchronized with state information that is stored in the persistent data store. At operation 1208, the application is run (e.g., executed on the stateless computing platform) using the application virtualization layer. Once the application begins running, events are evaluated by the application virtualization layer to identify events that may trigger state changes and notifications are sent to a state capture service when such events are identified. At operation 1210, an application state change event is detected. At the state capture service, the notifications are evaluated and the set of storage objects is updated in response to the evaluations. As described above, machine learning is used to identify state related storage objects during execution of the application on the stateless computing platform and the identified state related storage objects are added to the set of storage objects that is monitored. The set of storage objects is stored in the in-process memory of the state capture service while the application is executing on the state capture service. The set of storage objects is also stored in the persistent data store so that the state information is preserved for a next use of the containerized stateful application by the same user.

At operation 1212, the state capture service notifies the application virtualization layer that a state change event has been identified. At operation 1214, the application portal is notified of a state change event by the application virtualization layer. In an embodiment, the application portal updates an application-specific and user-specific configuration file in response to the state change event. In an embodiment, a notification to the application portal allows the application portal to record a newly learned redirection rule in an application-specific and user-specific configuration file so that the redirection rules that are learned during execution of the application (e.g., through the machine learning process) are persisted across different execution instances (e.g., execution instance 1 and execution instance 2) of the containerized application for a particular end-user. For example, if the state capture service learns about a state changing redirection rule that redirects path "P" to path "Q," (P→Q), then the rule is recorded in the in-process memory of the state capture service and an event notification, which identifies the redirection rule (e.g., P→Q), is sent to the application portal. The application portal writes the new redirection rule in a corresponding application-specific and user-specific configuration file. When the same application is launched by the same end-user at a subsequent point in time (as a different execution instance and possibly on a different stateless platform), the state capture service will read the application-specific and user-specific configuration file and load the file (as its corresponding rules) into its in-process memory. If the state capture service encounters path "P" again, path "P" will automatically be redirected to path "Q" without having to learn the redirection rule again. At operation 1216, the application virtualization layer notifies the state capture service that the application is closed (e.g., execution of the application at the stateless computing platform is ended) and the state capture service saves the latest state information, or any last state update, in the persistent data store.

In an embodiment, information related to the events that are generated by an application is organized into frames for use in the operations described above. Example frame formats are described with reference to FIGS. 13-20. FIG. 13 is an example of a generic frame format used for recording state change operations. The frame format includes a handle field, a type field, an operation field, a location field, and a data field. In an embodiment, the handle field identifies a handle, which is a unique identifier to identify a file/registry's record within the memory of the state capture service. The type field identifies a Boolean flag that indicates if the corresponding operation is file related or registry related. For example, the flag can be '0' for file and '1' for registry. The operation field specifies what operation, e.g., API call, was triggered. The path field is an optional field that specifies the full path of the file/registry associated with the operation. For example, the path field is typically used in create/open operation notifications. The data field is an optional field specifying the data/value that is to be written, set, or modified. For example, the data field is typically used in write/set operation notifications.

FIG. 14 is an example of a create file/open file frame format. The create file/open file frame format includes an identifier field, a type field, an API call field, and a path field. In an embodiment, the identifier field is the local file handle with which the file was created/opened. Though this handle is valid only within the application which is triggering the operation, the handle serves as a unique identifier within the memory of the state capture service. The type field for a CreateFile operation is File, which is indicated by 0. The API call field is CreateFile as that is the corresponding operation performed by the application. The path field for the CreateFile operation is a mandatory field, which includes the entire path of the file being created/opened (e.g., C:\TEMP\A.txt).

FIG. 15 is an example of a write file frame format. The write file frame format includes an identifier field, a type field, an API call field, and a data field. In an embodiment, the identifier field is the local file handle for the file. The type field for a WriteFile operation is File, which is indicated by 0. The API call field is WriteFile as that is the corresponding operation performed by the application. The data field for the WriteFile operation is the data to be written.

FIG. 16 is an example of a close file frame format. The close file frame format includes an identifier field, a type field, and an API call field. In an embodiment, the identifier field is the local file handle for the file. The type field for a CloseFile operation is File, which indicated by 0. The API call field is CloseFile as that is the corresponding operation performed by the application.

FIG. 17 is an example of a create registry frame format. The create registry frame format includes an identifier field, a type field, an API call field, and a path field. In an embodiment, the identifier field is the local registry handle with which the registry was created. The type field for a create registry operation is Reg, which is indicated by 1. The API call field is RegCreateKey as that is the corresponding operation performed by the application. The path field for the RegCreateKey operation is a mandatory field, which includes the entire path of the registry being created (e.g., HKCU\XX\YY).

FIG. 18 is an example of an open registry frame format. The open registry frame format includes an identifier field, a type field, an API call field, and a path field. In an embodiment, the identifier field is the local registry handle with which the registry was opened. The type field for an open registry operation is Reg, which is indicated by 1. The API call field is RegOpenKey as that is the corresponding operation performed by the application. The path field for the RegOpenKey operation is a mandatory field, which includes the entire path of the registry being opened (e.g., HKCU\XX\YY).

FIG. 19 is an example of a modify registry frame format. The modify registry frame format includes an identifier field, a type field, an API call field, and a value field. In an embodiment, the identifier field is the local registry handle. The type field for a modify registry operation is Reg, which is indicated by 1. The API call field is RegSetValue as that is the corresponding operation performed by the application. The value field for the RegSetValue operation is value that is to be set.

FIG. 20 is an example of a close registry frame format. The close registry frame format includes an identifier field, a type field, and an API call field. In an embodiment, the identifier field is the local registry handle for the registry. The type field for a close registry operation is Reg, which is indicated by 1. The API call field is RegCloseKey as that is the corresponding operation performed by the application.

Various operations utilizing the above-described frame formats are now described. Consider a scenario where a containerized application is writing to a file. If the dynamic redirections approach is used, the API calls are recorded in the in-process memory of the application virtualization layer and the application virtualization layer performs the activities to capture the state of the application. Whereas, if the state capture service approach is used, then the application virtualization layer sends a notification to state capture service and the state capture service performs the rest of the activities related to capturing the state of application.

In an example operation, an application will first perform a "create/open file" operation with desired access of "write" flag (FILE_APPEND_DATA, FILE_WRITE_ATTRIBUTES, FILE_WRITE_DATA, FILE_WRITE_EA, STANDARD_RIGHTS_WRITE, SYNCHRONIZE). The application virtualization layer will get a hold of this call from within its handlers and detect that the application is likely to perform a write operation on the file. The application virtualization layer will then use CreateFile/OpenFile format (see FIG. FIG. 14) to track the state of the application based on which approach is used (dynamic redirections or state capture service).

The state capture service will record this operation in its in-process memory along with the information about the operation. After the create/open file, the application executes a WriteFile call to modify the contents of the file. The application virtualization layer will get a hold of this call from within handlers and extract the information such as the file handle. The application virtualization layer might optionally extract the contents from data getting written. Then, the application virtualization layer will either send a notification to state capture service (as shown in FIG. 15) or record the frame in its own in-process memory. When using the dynamic redirections approach, the application virtualization layer will redirect the call to the persistent data store and in the case of the state capture service approach, the state capture service will mark its in-memory record related to the file handle as "Written." Marking the file as "Written" indicates that the file is to be captured in the persistent data store (as it has been modified). Then, the state capture service can either copy the whole file to the persistent data store or append the data from the optional data field to the file (e.g., depending on the file pointer location). The state capture service approach can provide a benefit of writing only what has changed (e.g., the "delta") instead of copying the whole file.

After some time, the application will eventually close the file. When the application virtualization layer receives a close call (e.g., from within its handler, such as NtCloseFile), the application virtualization layer performs the closing operations. If the dynamic redirections approach is used, then the application virtualization layer will just redirect the call to close the file in the persistent data store. Whereas, if the state capturing service approach is used, the application virtualization layer will send a close notification to state capture service using the close file notification frame format as shown in FIG. 16. The state capture service will then mark its in-process memory record related to this file handle as "Closed." After the actual application finishes the close file operation, the state capture service will either copy the whole file from its original location to the persistent data store by opening the file in shared mode (e.g., so that other applications do not get locked), or the state capture service can perform a delta write using the data that was sent in the WriteFile notification.

In an embodiment, the processing of registry related events is similar to the processing of file related events. If the dynamic redirections approach is used, the API calls will be recorded in application virtualization layer's in-process memory and the application virtualization layer performs the activities to capture the state of the application's registry. Whereas, if the state capturing service approach is used, then the application virtualization layer will send a notification to state capturing service and the state capturing service will perform the activities of capturing the state of application.

In the case of registry related operations, it is likely that the application will first perform a "create/open registry" operation with desired access of "write" or "set value." The application virtualization layer will get a hold of the API call from within its handlers and detect that the application is likely to perform a write operation on this registry key or subkeys. The application virtualization layer will then use the CreateRegistry or OpenRegistry frame format as described with reference to FIGS. 17 and 18 to track the state of the application based on which approach is used, dynamic redirections or state capture service).

After the create/open registry, the application executes a registry related call such as RegSetValue, RegSetKeyValue, RegDeleteValue, RegDeleteKeyValue to modify the contents of the registry. The application virtualization layer will get a hold of this call from within ntdll handlers and extract information such as the registry handle. The application virtualization layer might optionally extract the contents from data getting set for a SetValue type of operation. Then, the application virtualization layer will either send a notification to state capture service, such as the notification described with reference to FIG. 19, or record the value in its own in-process memory. In the case of the dynamic redirections approach, the application virtualization layer will redirect the call to the persistent data store and in the case of the state capture service approach, the state capture service will mark its in-process memory record related to this registry handle as "Written." Marking the record as "Written" indicates that the registry is to be captured in the persistent data store (as it has been modified). Then, the state capture service can either copy the whole registry hive to the persistent data store or set the data from the optional data field to the registry (depending on the file pointer location). The second approach may provide a benefit of setting only the value of what has changed instead of copying the whole registry. If the delete calls is triggered, then the corresponding key is deleted from persistent storage and the application virtualization layer/state capture service removes the key and/or all entries corresponding to the key/value from its memory.

After few set/query calls, the application will eventually close the registry handle. When the application virtualization layer receives a close call (from within its handlers), the application virtualization layer performs the closing operations. If the dynamic redirections approach is used, then the application virtualization layer will just redirect the call to close the registry in the persistent data store. Whereas, if the state capturing service approach is used, then the application virtualization layer will send a close notification to state capture service using a close registry notification frame format, such as the frame format described with reference to FIG. 20. The state capture service will then mark its in-process memory record related to this registry handle as "Closed." After the application finishes the close registry operation, the state capture service will either copy the whole registry hive from the original location to the persistent data store by opening the registry hive in shared mode (so that other apps don't get locked), or the state capture service can perform a delta write using the data that was sent in the SetFile notification.

Figure 21:
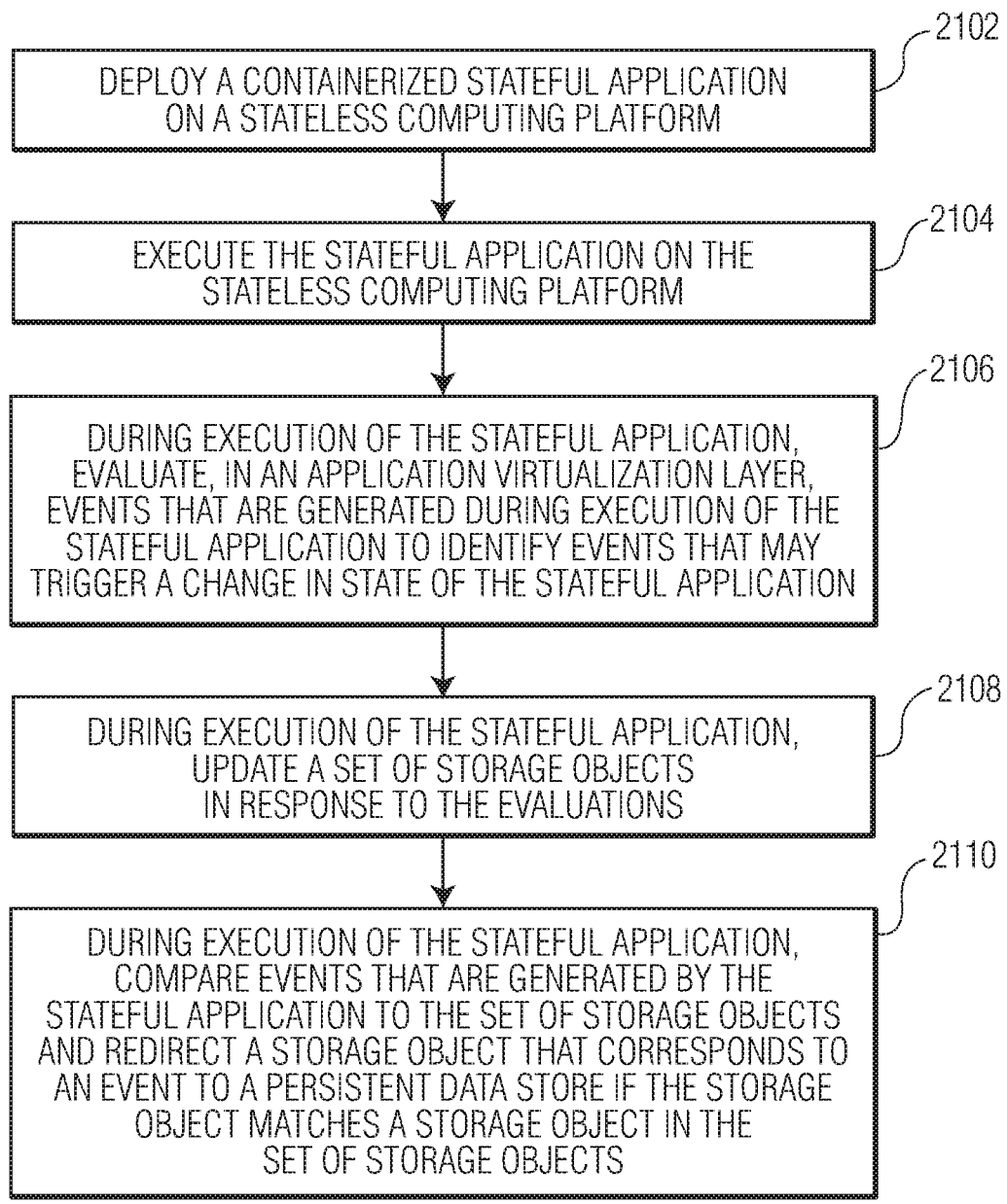
FIG. 21 is a process flow diagram of a method for executing a containerized stateful application that is deployed on a stateless computing platform.

FIG. 21 is a process flow diagram of a method for executing a containerized stateful application that is deployed on a stateless computing platform. At block 2102, a containerized stateful application is deployed on a stateless computing platform. At block 2104, the stateful application executes on the stateless computing platform. At block, 2106, during execution of the stateful application, events that are generated during execution of the stateful application are evaluated, in an application virtualization layer, to identify events that may trigger a change in state of the stateful application. At block 2108, during execution of the stateful application, a set of storage objects is updated in response to the evaluations. At block 2110, during execution of the stateful application, events that are generated by the stateful application are compared to the set of storage objects and a storage object that corresponds to an event is redirected to a persistent data store if the storage object matches a storage object in the set of storage objects.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for executing a containerized stateful application that is deployed on a stateless computing platform, the method comprising:
   deploying a containerized stateful application on a stateless computing platform;
   executing the stateful application on the stateless computing platform;
   during execution of the stateful application, evaluating, in an application virtualization layer, events that are generated during execution of the stateful application to identify events that may trigger a change in state of the stateful application, wherein events that may trigger a change in state of the stateful application are events from a predefined set of events, and wherein the predefined set of events includes file-related events, wherein the file-related events include CreateFile, WriteFile, DeleteFile, and CloseFile;
   during execution of the stateful application, automatically updating a monitored set of file paths that is stored in in-process volatile memory of the application virtualization layer in response to identifying an event from the predefined set of events, wherein file paths of the monitored set of file paths are defined by a drive identifier, a directory name, and a file name; and
   during execution of the stateful application, comparing, in the application virtualization layer, events that are generated by the stateful application to the automatically updated monitored set of file paths and redirecting, to a persistent data store, state information that corresponds to an event that matches a file path in the automatically updated monitored set of file paths;
   wherein automatically updating the monitored set of file paths that is stored in in-process volatile memory of the application virtualization layer during execution of the stateful application comprises applying machine learning to add a file path to the monitored set of file paths that is stored in in-process volatile memory of the application virtualization layer for use in subsequent event comparisons during execution of the stateful application for an event that is identified by a monitored set update engine as an event that may trigger a change in state of the stateful application and the file path for the event is not already in the monitored set of file paths that is stored in in-process volatile memory of the application virtualization layer;
   and
   storing the automatically updated monitored set of file paths in the persistent data store.

2. The method of claim 1, wherein events that may trigger a change in state of the stateful application include events that have a desired access of write.

3. The method of claim 1, wherein events that may trigger a change in state of the stateful application include file-related events that have a desired access of write.

4. A non-transitory computer readable medium that stores computer-executable code, which when executed by one or more processors implements a method, the method comprising:
   deploying a containerized stateful application on a stateless computing platform;
   executing the stateful application on the stateless computing platform;
   during execution of the stateful application, evaluating, in an application virtualization layer, events that are generated during execution of the stateful application to identify events that may trigger a change in state of the stateful application, wherein events that may trigger a change in state of the stateful application are events from a predefined set of events, and wherein the predefined set of events includes file-related events, wherein the file-related events include CreateFile, WriteFile, DeleteFile, and CloseFile;
   during execution of the stateful application, automatically updating a monitored set of file paths that is stored in in-process volatile memory of the application virtualization layer in response to identifying an event from the predefined set of events, wherein file paths of the monitored set of file paths are defined by a drive identifier, a directory name, and a file name; and
   during execution of the stateful application, comparing, in the application virtualization layer, events that are generated by the stateful application to the automatically updated monitored set of file paths and redirecting, to a persistent data store, state information that corresponds to an event that matches a file path in the automatically updated monitored set of file paths;

wherein automatically updating the monitored set of file paths that is stored in in-process volatile memory of the application virtualization layer during execution of the stateless application comprises applying machine learning to add a file path to the monitored set of file paths that is stored in in-process volatile memory of the application virtualization layer for use in subsequent event comparisons during execution of the stateful application for an event that is identified by a monitored set update engine as an event that may trigger a change in state of the stateful application and the file path for the event is not already in the monitored set of file paths that is stored in in-process volatile memory of the application virtualization layer; and storing the automatically updated monitored set of file paths in the persistent data store.

5. The method of claim 1, wherein automatically updating the monitored set of file paths that is stored in in-process volatile memory of the application virtualization layer comprises determining if a file path is included on an exclusion list and not adding the file path to the monitored set of file paths that is stored in in-process volatile memory of the application virtualization layer if the file path is on the exclusion list.

6. The method of claim 1, wherein automatically updating the monitored set of file paths that is stored in in-process volatile memory of the application virtualization layer comprises adding a file path to a search tree that is held in the in-process volatile memory of the application virtualization layer.

7. The non-transitory computer readable medium of claim 4 that stores computer-executable code, which when executed by one or more processors implements a method, wherein to automatically updating a monitored set of file paths that is stored in in-process volatile memory of the application virtualization layer comprises determining if a file path is included on an exclusion list and not adding the file path to the monitored set of file paths that is stored in in-process volatile memory of the application virtualization layer if the file path is on the exclusion list.

8. The non-transitory computer readable medium of claim 4 that stores computer-executable code, which when executed by one or more processors implements a method, wherein to automatically updating the monitored set of file paths that is stored in in-process volatile memory of the application virtualization layer comprises adding a file path to a search tree that is held in the in-process volatile memory of the application virtualization layer.

* * * * *